US011679616B2

(12) United States Patent
Mader et al.

(10) Patent No.: US 11,679,616 B2
(45) Date of Patent: Jun. 20, 2023

(54) METHOD FOR PRODUCING A HOLOGRAM, AND SECURITY ELEMENT AND A SECURITY DOCUMENT

(71) Applicant: OVD Kinegram AG, Zug (CH)

(72) Inventors: Sebastian Mader, Baar (CH); Harald Walter, Horgen (CH); Corrado Fraschina, Bonstetten (CH)

(73) Assignee: OVD Kinegram AG, Zug (CH)

( * ) Notice: Subject to any disclaimer, the term of this patent is extended or adjusted under 35 U.S.C. 154(b) by 363 days.

(21) Appl. No.: 16/644,832

(22) PCT Filed: Sep. 5, 2018

(86) PCT No.: PCT/EP2018/073904
§ 371 (c)(1),
(2) Date: Mar. 5, 2020

(87) PCT Pub. No.: WO2019/048499
PCT Pub. Date: Mar. 14, 2019

(65) Prior Publication Data
US 2020/0384791 A1 Dec. 10, 2020

(30) Foreign Application Priority Data
Sep. 6, 2017 (DE) .......................... 102017120536.5

(51) Int. Cl.
*G06T 17/10* (2006.01)
*G06T 15/50* (2011.01)
(Continued)

(52) U.S. Cl.
CPC ......... *B42D 25/328* (2014.10); *B42D 25/324* (2014.10); *G06T 15/50* (2013.01); *G06T 17/10* (2013.01)

(58) Field of Classification Search
None
See application file for complete search history.

(56) References Cited

U.S. PATENT DOCUMENTS 7,773,842 B2 * 8/2010 Greiner .............. G02B 6/29326
385/39
8,174,743 B2 5/2012 Drinkwater
(Continued)

FOREIGN PATENT DOCUMENTS

CN 101241204 A 8/2008
CN 103631125 A 3/2014
(Continued)

OTHER PUBLICATIONS

Athanasia Symeonidou et al: "Computer-generated holograms by multiple wavefront recording plane method with occlusion culling", Optics Express, XP055521605.
(Continued)

*Primary Examiner* — Tize Ma
(74) *Attorney, Agent, or Firm* — Hoffmann & Baron, LLP

(57) ABSTRACT

A method for producing a hologram (1), (1) for security elements (1*a*) and/or security documents (1*b*). One or more virtual hologram planes (10) are arranged in front of and/or behind one or more virtual models (20) and/or one or more virtual hologram planes (10) are arranged such that they intersect one or more virtual models (20). One or more virtual light sources (30) are arranged on one or more partial regions of the surface (21) of one or more of the virtual models (20). One or more virtual electromagnetic fields (40) are calculated starting from at least one of the virtual light sources (30) in one or more zones (11) of the one or more virtual hologram planes (10). In the one or more zones (11), in each case, a virtual total electromagnetic field (41) is calculated on the basis of the sum of two or more, of the virtual electromagnetic fields (40) in the respective zone (11). One or more phase images (50) are calculated from the virtual total electromagnetic fields (41) in the one or more zones (11). A height profile (60) of the hologram (1) is calculated from the one or more phase images (50) and the (Continued)

height profile (60) of the hologram (1) is incorporated into a substrate (2) to provide the hologram (1).

34 Claims, 31 Drawing Sheets

(51) Int. Cl.
  *B42D 25/328* (2014.01)
  *B42D 25/324* (2014.01)

(56) References Cited

U.S. PATENT DOCUMENTS

| | | | |
|---|---|---|---|
| 2005/0225816 A1 | 10/2005 | Kitamura et al. | |
| 2007/0195389 A1* | 8/2007 | Scheibenstock | G03H 1/0808 359/9 |
| 2008/0057407 A1* | 3/2008 | Kitamura | G03H 1/0808 430/2 |
| 2008/0259345 A1 | 10/2008 | Fukutake | |
| 2009/0162756 A1 | 6/2009 | Staub et al. | |
| 2010/0084851 A1 | 4/2010 | Schilling | |
| 2011/0069360 A1 | 3/2011 | Dichtl et al. | |
| 2011/0122467 A1* | 5/2011 | Futterer | G03H 1/02 359/9 |
| 2011/0134496 A1 | 6/2011 | Tompkin et al. | |
| 2011/0212387 A1* | 9/2011 | Hansen | G03H 1/18 430/2 |
| 2013/0099474 A1 | 4/2013 | Fuhse et al. | |
| 2014/0002873 A1 | 1/2014 | Tompkin et al. | |
| 2014/0146373 A1 | 5/2014 | Wey et al. | |
| 2015/0185696 A1* | 7/2015 | Rakhovsky | G03F 7/70408 359/9 |
| 2015/0224809 A1 | 8/2015 | Tompkin et al. | |
| 2017/0368864 A1 | 12/2017 | Walter et al. | |
| 2018/0117947 A1 | 5/2018 | Fuhse | |

FOREIGN PATENT DOCUMENTS

| | | |
|---|---|---|
| DE | 10236891 A1 | 3/2004 |
| DE | 102006016139 A1 | 10/2007 |
| DE | 102010025775 A1 | 1/2012 |
| EP | 0 766 103 A1 | 4/1997 |
| EP | 1 484 652 A1 | 12/2004 |
| EP | 2 068 209 A1 | 6/2009 |
| EP | 2 224 291 A1 | 9/2010 |
| EP | 2 676 802 A1 | 12/2013 |
| JP | 2001-109362 A | 4/2001 |
| JP | 2014-199449 A | 10/2014 |
| KR | 10-2016-00432385 A | 4/2016 |
| WO | 99/58327 | 11/1999 |
| WO | 99/59036 | 11/1999 |
| WO | 2005038136 A1 | 4/2005 |
| WO | 2008/026637 A1 | 3/2008 |
| WO | 2008/095706 A1 | 8/2008 |
| WO | 2008/123408 A1 | 10/2008 |
| WO | 2009/066771 A1 | 5/2009 |
| WO | 2010/043403 A1 | 4/2010 |
| WO | 2010058809 A1 | 5/2010 |
| WO | 2013/023052 A1 | 2/2013 |
| WO | 2016/113220 A1 | 7/2016 |
| WO | 2016180522 A1 | 11/2016 |

OTHER PUBLICATIONS

Hao Zhang et al: "Computer-generated hologram with occlusion effect using layer-based processing", Applied Optics, XP055393015.
Gilles Antonin et al: "Computer generated hologram from Multiview-plus-Depth data considering specular reflections", 2016 IEEE International Conference on Multimedia & Expo Workshops (ICMEW), XP0032970836.
Tomoki Yasuda et al: "Computer simulation of reconstructed image for computer-generated holograms", Proceedings of SPIE, XP055550144.
Daniela Karthaus et al: "Design and Simulation of Computer-generated volume Holograms for Automotive Headlamps" DGAO—Proceedings, XP055550095.
Hiroshi Yoshikawa, "Chapter 8 Computer-Generated Holograms for White Light Reconstruction" In: "Digital Holography and Three-Dimensional Display", XP055550208.
European Office Action dated Jun. 14, 2022.
Japanese Office Action dated Oct. 4, 2022.
Japanese Office Action dated Jan. 10, 2023.

* cited by examiner

60a

METHOD FOR PRODUCING A HOLOGRAM, AND SECURITY ELEMENT AND A SECURITY DOCUMENT

This application claims priority based on an International Application filed under the Patent Cooperation Treaty, PCT/EP2018/073904, filed Sep. 5, 2018, which claims priority to DE 102017120536.5, filed Sep. 6, 2017.

BACKGROUND OF THE INVENTION

The invention relates to a method for producing a hologram, and a security element and a security document.

Optically variable security elements are used to increase the protection against forgery of security documents such as for instance passports, banknotes, check cards, visas, credit cards or certificates. In addition to increasing the protection against forgery of these security elements, the optically variable effects provided by the security elements can be easily and clearly recognized by laypeople, with the result that a layperson can, without a great effort, determine the authenticity of a security document equipped with such a security element and can recognize manipulations on or forgeries of the security document.

In particular, diffractive structures are used as security elements, for example diffraction gratings or holograms.

Here, holograms are usually produced by means of holographic methods. For this purpose, for example, a three-dimensional model is illuminated with a coherent light beam and the light reflected by the three-dimensional model is superimposed with a coherent reference light beam and the interference pattern forming hereby is recorded.

Methods for producing holograms which are supported on mathematical calculations are further known. Thus, for example, EP 0 766 103 B1 describes a method for producing a hologram in which the procedure is as follows: one or more image templates are broken down into partial regions, in particular strip-shaped partial regions. An assigned diffraction grating is identified depending on the respective grayscale value of this partial region and then these identified diffraction gratings are gridded in each other in order to generate a corresponding holographic representation.

The disadvantage of such methods, however, is that due to the division into partial regions undesired diffraction effects occur at their transitions. Limitations further also result with respect to the optical effects that can be generated by means of such methods.

SUMMARY OF THE INVENTION

The object of the present invention is to provide a method for producing a hologram with which the security against manipulation and/or the security against forgery of the hologram can be improved, as well as to provide an improved security element and an improved security document.

The object is achieved by a method for producing a hologram, in particular a hologram for security elements and/or security documents. In this method the procedure is as follows:
one or more virtual hologram planes are arranged in front of and/or behind one or more virtual models and/or one or more virtual hologram planes are arranged such that they intersect one or more virtual models,
one or more virtual light sources are arranged on one or more partial regions of the surface of one or more of the virtual models,
one or more virtual electromagnetic fields are calculated starting from at least one of the virtual light sources in one or more zones of the one or more virtual hologram planes,
in the one or more zones, in each case, a virtual total electromagnetic field is calculated on the basis of the sum of two or more, in particular all, of the virtual electromagnetic fields in the respective zone,
one or more phase images are calculated from the virtual total electromagnetic fields in the one or more zones,
a height profile of the hologram is calculated from the one or more phase images and the height profile of the hologram is incorporated into a substrate to provide the hologram.

The object is further achieved by a security element. The security element has a substrate into which the height profile of a hologram is incorporated. The hologram is calculated from one or more phase images. The one or more phase images are calculated from one or more virtual total electromagnetic fields in one or more zones of one or more virtual hologram planes. Each of the virtual total electromagnetic fields is calculated in each case on the basis of the sum of two or more virtual electromagnetic fields, in each case starting from at least one virtual light source, preferably starting from at least two virtual light sources, in the respective zone. The two or more virtual light sources are arranged on one or more partial regions of the surface of one or more virtual models. The one or more virtual hologram planes are arranged in front of and/or behind one or more of the virtual models and/or one or more of the virtual hologram planes intersect one or more of the virtual models.

The object is further achieved by a security document which has at least one such security element.

Such a method for producing a hologram is characterized in that holograms can be produced cost-effectively, which are characterized by a high degree of complexity and/or optical effects which cannot be realized with the known methods. Hereby, the advantage is further achieved that the holograms produced by means of this method cannot be imitated or reproduced, or can only be imitated or reproduced with a great effort, with the known methods.

The security elements and security documents according to the invention are thus characterized by a significantly improved security against manipulation and/or security against forgery.

By "virtual" is meant in particular "computer-simulated". For example, the virtual hologram plane is a hologram plane which is simulated by a computer. Such computer-simulated holograms are also called computer-generated holograms (CGHs).

By "virtual hologram plane" is meant a plane in a virtual space, in particular a three-dimensional space which is determined by the coordinate axes x, y, z. The coordinate axes x, y, z are preferably arranged orthogonal to each other, whereby each of the directions determined by the coordinate axes x, y, z is arranged perpendicular, i.e. at a right angle, to each other. In particular, the coordinate axes x, y, z have a common coordinate origin at the virtual point (x=0, y=0, z=0). The virtual hologram planes $(x_h, y_h)$ are determined by the surface area $(x=x_h, y=y_h, z)$ in the virtual space, in particular as one-dimensional or two-dimensional partial bodies, of the virtual space (x, y, z), in particular of the three-dimensional virtual space. Z can be zero or can also assume values different from zero.

The virtual space determined by the coordinate axes x, y, z and/or $x=x_h, y=y_h$ or the virtual hologram planes consist in particular of a plurality of discrete virtual points $(x_i, y_i, z_i)$ or ($x_h$, $y_h$), wherein the index i or the index h is preferably chosen from a subset of the natural numbers.

By "discrete virtual points" is meant virtual points in the virtual space which are spaced apart from each other by the same or different distances. In particular, neighboring ones of the discrete virtual points are spaced apart from each other by the same or different distances.

For example, the index i can run from 1 to 1000 for each of the three coordinate axes x, y, z, whereby the virtual space is represented by 1000×1000×1000 virtual points ($x_i$, $y_i$, $z_i$) with respect to the coordinate axes x, y, z, and the index h can run from 1 to 5000 for each of the two coordinate axes $x=x_h$, $y=y_h$, whereby the hologram plane is represented by 5000×5000 virtual points ($x_h$, $y_h$). In the directions defined by the coordinates $x=x_h$, $y=y_h$, one or more of the virtual hologram planes preferably do not extend completely over the virtual space in the corresponding directions.

By a "virtual model" is meant one or more one-dimensional curved or straight lines and/or one or more two-dimensional curved or non-curved surfaces and/or one or more two-dimensional curved or non-curved surfaces or partial regions of surfaces of one or more three-dimensional objects or bodies. The one or more virtual models are preferably arranged in the virtual space. The virtual points on the virtual models can act as virtual light sources in the computer-aided simulation.

By "virtual light source" is meant the origin of one of the virtual electromagnetic fields in the virtual space, wherein the one or more electromagnetic fields are simulated by electromagnetic wave equations.

By "phase image" is meant an image, in particular a two-dimensional image, which comprises the phases of the one or more total electromagnetic fields in one or more of the zones and/or in one or more of the virtual hologram planes. The phase in one virtual point ($x_h$, $y_h$) in one of the hologram planes is preferably assigned to a corresponding point of one of the corresponding phase images. In particular, the phase images have the same resolution as the corresponding zones and/or virtual hologram planes.

Advantageous embodiments of the invention are described in the dependent claims.

One or more of the virtual models are preferably formed in each case as a virtual 2D model (2D=two-dimensional) or as a virtual 3D model (3D=three-dimensional).

By a virtual 2D model is preferably meant here one or more coherent or partially coherent or non-coherent two-dimensional surfaces. One or more of the two-dimensional surfaces are in particular formed open, like for example a circular surface. For example, a 2D model corresponds to a partial region of the surface of a three-dimensional body, e.g. a human head. By a virtual 3D model is meant in particular the closed surface of a three-dimensional body, such as for example the surface of a sphere.

It is possible to arrange one or more of the 2D and/or 3D models in front of and/or behind one or more of the hologram planes and/or to arrange them such that one or more of the 2D and/or 3D models intersect with one or more of the hologram planes.

The virtual electromagnetic field, which starts from two or more of the virtual light sources, in particular starts from all of the virtual light sources, preferably has the same intensity and/or the same intensity distribution over the entire solid angle.

By "intensity" is meant the proportion of the entire radiant power which is emitted by one or more of the virtual light sources at a predetermined solid angle, wherein the radiant power is in particular regarded as the amount of energy which is transported by an electromagnetic field, in particular one or more of the virtual electromagnetic fields, within a predetermined time interval. The radiant power is given in Watts.

By "intensity distribution" is meant the respective radiant power at one or more different solid angles. The respective radiant powers of one or more of the different solid angles are in particular different from each other.

By "range of solid angles" or "solid angle" is meant the area of a partial surface of a spherical surface, which is divided by the square of the radius R of the sphere. The range of solid angles is given in particular in the dimensionless unit steradian. The entire solid angle corresponds to the surface of the unit sphere, i.e. a sphere with a radius of one, thus $4\pi$.

The virtual electromagnetic field, which starts from two or more of the virtual light sources, in particular starts from all of the virtual light sources, preferably has different intensities and/or different intensity distributions over one or more ranges of solid angles, in particular over the entire solid angle.

The virtual electromagnetic field, which starts from one or more of the virtual light sources, in particular starts from all of the virtual light sources, preferably has an isotropic or an anisotropic intensity distribution over one or more solid angles, in particular over the entire solid angle.

By "isotropic intensity distribution" is meant an intensity distribution the radiant power of which is the same over all solid angles.

By "anisotropic intensity distribution" is meant an intensity distribution the radiant power of which differs in at least one first solid angle from at least one second solid angle.

In particular, one or more or all of the virtual light sources, in particular one or more or all of the virtual point light sources, have the same intensity and/or the same intensity distribution.

One or more of the virtual light sources, in particular all of the virtual light sources, preferably form a virtual point light source, wherein the virtual point light sources preferably emit a virtual spherical wave.

A point which is illuminated with a plane wave emits a spherical wave. The interference pattern which forms in the hologram plane here is called a Fresnel zone plate. The hologram of an individual point is thus a Fresnel zone plate. If an object consists of several points, each point produces its own Fresnel zone plate during the hologram recording or the hologram calculation. These Fresnel zone plates are superimposed and together form the hologram of the object.

By "spherical wave" is meant a wave which propagates in concentric wavefronts from a light source, in particular a virtual light source, in the entire solid angle. The virtual light source is preferably regarded as a punctiform source of the spherical wave.

The beam cone of the virtual light source, in particular of the virtual point light source, is preferably restricted to a range of solid angles of ±45°, preferably to a range of solid angles of ±35°, particularly preferably to a range of solid angles of ±25° and in particular preferably to ±15°, by means of one or more virtual apertures.

One or more of the virtual apertures preferably have a circular, elliptical, square, rectangular or annular opening. It is possible for the virtual apertures to have other shapes, such as for example a star shape.

The one or more ranges of solid angles are in particular arranged symmetrically or asymmetrically around the surface normal, in particular around the average surface normal, of the virtual hologram plane. One or more of the ranges of solid angles span in particular a range of angles of from 0° to 45°, preferably a range of angles of from 0° to 30°, in particular preferably a range of angles of from 0° to 15°, relative to the respective surface normals of the assigned virtual hologram planes, in particular relative to the average surface normal. In particular, a range of solid angles can encompass a range of angles of from 5° to 30°, particularly preferably of from 5° to 15°.

In the case of the superimposition of many motifs of the same and/or different objects in one or different viewing directions it is advantageous if the range of solid angles is split into equidistant or non-equidistant ranges of angles. For example, if 30 motifs are used, a range of solid angles of from 0° to 30° is split into ranges of angles 1° wide per motif. The ranges of angles can also overlap entirely or partially. This is advantageous for the representation of continuous or almost continuous movement and/or transformation effects, similar to a film composed of assembled stills differing slightly from each other.

The one or more virtual apertures restrict in particular one or more of the virtual electromagnetic fields, in particular the solid angles of one or more of the virtual electromagnetic fields, of one or more virtual light sources such that the virtual total electromagnetic field added together from the virtual electromagnetic fields is calculated only in the corresponding one or more zones of the one or more virtual hologram planes. This leads to an advantageous reduction of the required calculation time on a computer.

The virtual electromagnetic field $U_i$, which starts from an i-th virtual point light source at the point $(x_i, y_i, z_i)$, is preferably calculated at a point $(x_h, y_h, z_h)$ of the at least one zone, in particular the at least one zone in the hologram plane, by means of the equation $$U_i(x_h, y_h) = \frac{\exp(ikr)}{r}, r = \sqrt{(x_h - x_i)^2 + (y_h - y_i)^2 + z_i^2},$$

The distance $z_h$ from the electromagnetic field $U_i$ to the hologram plane or zone which is defined by the coordinates $(x_h, y_h)$ is for example zero in the special case of a non-curved hologram plane which is placed on the coordinate origin. The letter "i" in the argument of the exponential function denotes the imaginary unit. The distance r describes the Euclidean distance between a point $(x_i, y_i, z_i)$ in the virtual space and a point $(x_h, y_h, z_h=0)$ in the virtual hologram plane.

Optionally, the z component $z_i$ can also be varied by a random amount, preferably in the range of ±10 times the wavelength λ used for the calculation, further preferably ±5 times λ and in particular preferably ±0.5 times λ. This has the advantage that the calculated phase image has no or greatly reduced periodic structural portions which lead to undesired diffraction effects and/or color effects.

It is possible for one of the zones to be determined from one or more intersections of one or more solid angles and one or more hologram planes. For example, a range of solid angles which spans a particular volume can intersect several hologram planes arranged one behind another and/or arranged next to each other, with the result that the zone assigned to this solid angle is composed of corresponding intersections of the solid angle and the hologram planes.

The virtual light sources, which are arranged on one or more of the partial regions of the surface of one or more of the virtual models, are preferably arranged periodically on one or more of the partial regions of the surface of the virtual model in at least one direction and/or arranged randomly or pseudo-randomly on one or more of the partial regions of the surface of the virtual model in at least one direction.

In an embodiment the virtual light sources are first arranged in a flat plane and then projected virtually onto the surface of the object to be represented.

In the case of a virtual 2D model the virtual light sources are preferably arranged inside a closed shape surrounding the virtual 2D model, in particular outside the virtual 2D model. The circumjacent or surrounding shape preferably forms a geometric shape, for example a circle or a rectangle, in particular a freeform surface. A hologram produced hereby preferably displays a negative image of the surface of the virtual 2D model.

It is possible for the distribution of the virtual light sources distributed randomly or pseudo-randomly in at least one direction to follow a Gaussian distribution, in particular an asymmetrical distribution. In particular, the virtual light sources are arranged in the form of a point cloud or in wave form on one or more of the partial regions of the surface of the virtual model.

Preferably, the distances between neighboring virtual light sources are preferably between 5 μm and 500 μm, further preferably between 10 μm and 200 μm.

It is possible for the virtual light sources to be arranged as a one-dimensional grid, in particular a line grid, or a two-dimensional grid, in particular a dot grid.

The arrangement of the virtual light sources, in particular of the virtual point light sources, is preferably effected as a cross grid, wherein the distance between neighboring virtual light sources is between 5 μm and 500 μm, in particular between 10 μm and 200 μm.

One or more of the virtual light sources preferably have the form of microsymbols. The microsymbols are in particular selected from: letter, portrait, image, alphanumeric character, character, geometric freeform, square, triangle, circle, star, moon, denomination sign, country-specific symbol (e.g. the Swiss cross, the German Federal eagle, the Canadian maple leaf), curved line or outline (e.g. a contour of country borders).

It is further possible for one or more of the virtual light sources to have the form of microsymbols, such as for example one or more letters, portraits, images, alphanumeric characters, characters, geometric freeforms, squares, triangles, circles, star, moon, denomination signs, country-specific symbol (e.g. the Swiss cross, the German Federal eagle, the Canadian maple leaf), curved lines or outlines (e.g. a contour of country borders), in which the virtual light sources are arranged at predetermined distances along the contours of the microsymbols.

The lateral dimensions of the microsymbols on one or more of the partial regions of the surface of one or more of the virtual models are preferably between 5 μm and 500 μm, in particular between 10 μm and 200 μm.

Studies have shown that in the case of the observation of a hologram by a human, during the calculation thereof, virtual light sources in the form of microsymbols are used, only one or more of the underlying virtual models are detected, and not the microsymbols from which the model is constructed. In particular, the microsymbols are detectable only through a magnifying lens system, preferably a magnifying glass or a camera, wherein it can be detected that the motifs are composed of microsymbols.

The utilization of a hologram plane, in particular the utilization of two or more virtual hologram planes, is particularly preferably provided, wherein each of the virtual hologram planes has one or more of the zones.

The two or more virtual hologram planes preferably differ in relation to their alignment, positioning, dimensions and/or curvature. The two or more virtual hologram planes further differ in particular in the respective zones in relation to their alignment, positioning, dimensions and/or curvature.

By "alignment" is meant in particular the angle or the angles of the respective surface normals spanned by the hologram planes with respect to one or more of the axes defined by the coordinates (x, y, z).

By "positioning" is meant in particular the position of one or more of the hologram planes and/or one or more points $(x_h, y_h, z_h)$, in particular one or more points $(x_h, y_h, z_h=0)$, one or more of the virtual hologram planes in the virtual space spanned by the coordinates (x, y, z).

By "dimensions" is meant in particular the extent or the extents of the one or more hologram planes along the directions defined by the coordinates (x, y, z) in the virtual space.

By "curvature" is meant in particular a local deviation of a curve from a straight line. By the curvature of a curve is meant in particular one change in direction per length and/or stretch passed through of a sufficiently short curve piece or curve progression. The curvature of a straight line is equal to zero everywhere. A circle with a radius R has the same curvature everywhere, namely 1/R. In the case of most curves the curvature changes from curve point to curve point. In particular, the curvature changes continuously from curve point to curve point, with the result that the curves have in particular no kinks and/or points of discontinuity. The curvature of a curve at a point P thus indicates how strongly the curves of the immediate surroundings of the point P deviates from a straight line. The amount of the curvature is called the radius of curvature and this corresponds to the inverse value of the amount of a local radius vector. The radius of curvature is the radius of the circle which only just touches the tangential point P and/or represents the best approximation in the local surroundings of the tangential point P. A curve is for example the two-dimensional surface of a sphere or a circular surface.

Preferably one virtual model is provided, further preferably two or more virtual models are provided.

Each of the one or more virtual models is preferably assigned to one of the virtual hologram planes. In particular, the one or more virtual electromagnetic fields starting from the one or more virtual light sources of the assigned virtual model are calculated in the one or more zones of the respective virtual hologram plane.

The virtual model or each of the one or more virtual models is preferably assigned to one or more of the virtual hologram planes, and the one or more virtual electromagnetic fields starting from the one or more virtual light sources of the assigned virtual model or of the assigned virtual models are calculated in the one or more zones of the respective virtual hologram plane.

To calculate the one or more phase images, the virtual total electromagnetic fields are preferably superimposed by two or more of the zones, in particular by two or more of the zones which are zones of different ones of the virtual hologram planes. In particular, to calculate the one or more phase images, the virtual total electromagnetic fields are superimposed by two or more of the zones, in particular by two or more of the zones which are zones of different ones of the virtual hologram planes, on the basis of a predefined reference direction.

The one or more virtual models are preferably assigned in each case to one or more motifs which are generated by the provided holograms. Thus, in particular, the geometric shaping of the one or more motifs generated by the provided hologram corresponds to the geometric shaping of one or more of the virtual models, optionally additionally influenced by a transformation function, which comprises in particular a demagnified, magnified or geometrically distorted projection.

By a hologram is preferably meant a structure which generates one or more motifs in the range of visible and/or invisible light when illuminated with visible and/or invisible light. Here, the hologram can be recognizable for a human observer and/or detectable for an optical sensor.

For example, when viewed the motifs can take on the form of one or more letters, portraits, representations of landscapes or buildings, images, barcodes, QR codes, alphanumeric characters, characters, geometric freeforms, squares, triangles, circles, curved lines and/or outlines or the form of combinations of one or more of the above shapes and/or the negatives thereof.

It is further possible for the one or more motifs to be composed in each case of one or more patterns and/or to be superimposed, wherein the patterns preferably have a geometry and/or shape which are in particular in each case selected or combined from: line, straight line, motif, image, triangle, barcode, QR code, wave, quadrangle, polygon, curved line, circle, oval, trapezoid, parallelogram, rhombus, cross, sickle, branch structure, star, ellipse, random pattern, pseudo-random pattern, Mandelbrot set, in particular a fractal or the Mandelbrot set, wherein in particular the patterns are superimposed and/or complete each other.

The shaping of the one or more motifs provided by the provided hologram is preferably influenced or defined by the choice of the one or more virtual models. The optically variable appearance of the one or more motif provided by the provided hologram as well as their positional arrangement relative to each other is further preferably influenced or defined by the choice of the corresponding positional arrangement of the one or more virtual hologram planes relative to the one or more virtual motifs. The optically variable appearance can, for example if a fish is chosen as motif, simulate the swimming motion of the fish. Further, the optically variable appearance is preferably influenced by the corresponding choice of the parameters and arrangement of the virtual light sources, by which the coloring as well as the brightness of the motifs and their course is further preferably also influenced or defined correspondingly.

This is explained in the following with reference to several preferred embodiments:

The two or more zones superimposed to calculate the one or more phase images preferably overlap at least partially, preferably completely, in relation to the predefined reference direction. It is hereby preferably brought about that two or more motifs provided by different zones in the provided hologram are generated in intersecting regions of surface of the provided hologram in relation to the predefined reference direction.

The two or more zones superimposed to calculate the one or more phase images preferably do not overlap in relation to the predefined reference direction, with the result that two or more motifs provided by different zones in the provided hologram are preferably generated in separate regions of surface of the provided hologram in relation to the predefined reference direction.

Any desired direction with respect to the coordinate axes x, y, z can be chosen as reference direction.

One or more of the virtual hologram planes in one or more of the zones preferably have a curvature different from zero at least along a reference direction. The virtual hologram planes are in particular convexly or concavely curved. The virtual hologram planes preferably have a local curvature wherein the radius of curvature assigned to the local curvature is in particular between 5 mm and 50 mm, preferably between 10 mm and 30 mm. The local curvature can be in particular in the form of circular segments or in the form of parabolic segments.

The geometry of one or more of the virtual hologram planes in one or more of the zones preferably corresponds in each case to a lateral surface of a cylindrical segment or a freeform surface.

By "freeform surface" is meant in particular an open or closed two-dimensional surface in a three-dimensional space which is flat or curved in at least one direction. For example, the surface of a sphere and the surface of a torus are closed freeform surfaces. A saddle surface and a curved circular surface are open freeform surfaces, for example.

One or more of the virtual hologram planes in one or more of the zones preferably have a predetermined curvature progression. In particular, the virtual total electromagnetic field in the one or more zones is calculated in each case on the basis of the virtual electromagnetic fields of one or more first ones of the one or more virtual models. The provided hologram is hereby partially or completely detectable for an observer and/or for a sensor when the substrate is bent or curved according to the curvature progression of the one or more zones. One or more first motifs assigned to the one or more first virtual models preferably become partially or completely detectable for the observer when the substrate is bent or curved according to the curvature progression of the one or more zones. These one or more first motifs are preferably not detectable or at least detectable only with difficulty for the observer if the substrate is not bent or curved, but is flat.

For example, a photodetector, a camera, in particular a CCD or CMOS chip, which detects electromagnetic radiation from the visible range of the electromagnetic spectrum or from one or more partial regions of the electromagnetic spectrum, comes as sensor. For example, the sensor can be the camera of a smartphone or of another mobile device or also of a stationary device with a camera. Optionally, the illumination of the hologram can be effected by the LED light of the smartphone or of the other device. This has the advantages firstly that there is strongly directed illumination when the image is captured by the camera and secondly that the direction of the illumination in relation to the sensor is defined comparatively precisely.

It is also possible for the provided hologram to be detected by one or more sensors in the IR range and/or the range of the light visible to the naked human eye and/or the UV range (IR=infrared=radiation from one or more portions of the infrared range of the electromagnetic spectrum, UV=ultraviolet=radiation from one or more portions of the ultraviolet range of the electromagnetic spectrum) and optionally to be made detectable for an observer.

The one or more first motifs preferably display to an observer at least one section of a larger motif or of a total motif when the substrate is bent or curved according to the curvature progression of the one or more zones, wherein the total motif comprises in particular one or more motifs, preferably one or more first motifs. For example, a security element designed in such a way in the form of a strip displays a strip-shaped section of a bridge when bent or curved. If a security element designed in such a way is applied to a security document, for example to a banknote, which in particular displays the complete image of the bridge except for the strip-shaped section, then the design of the banknote in the flat state preferably appears incomplete, as the motif in the strip-shaped security element is in particular not detectable or detectable only with difficulty. When the banknote is bent or curved, the missing portion of the bridge now preferably also becomes visible and in the process supplements or completes the design of the banknote.

The one or more first motifs are preferably detectable for an observer and/or for a sensor completely above and/or underneath and/or within the plane spanned by the substrate when the substrate is bent or curved according to the curvature progression of the one or more zones. Preferably, the distance between one or more of the first motifs and the plane spanned by the substrate is preferably between −30 mm and +30 mm, preferably between −15 mm and +15 mm, in particular preferably between −10 mm and +10 mm, further preferably between −5 mm and +5 mm and still further preferably between −3 mm and +3 mm.

Two or more of the virtual hologram planes in one or more first ones of the zones preferably have a different curvature progression and/or a different alignment from the curvature progression in one or more second ones of the zones. The virtual total electromagnetic fields in the one or more first and second zones are preferably calculated in each case on the basis of the virtual electromagnetic fields of one or more first or second ones of the one or more virtual models. In particular, the provided hologram is hereby partially or completely detectable for an observer and/or for a sensor when the substrate is bent or curved according to the curvature progression of the one or more first or second zones or when aligned according to the alignment of the first or second zones. The curvature progression of the one or more first and second zones is in particular not the same.

The virtual total electromagnetic fields in the one or more first zones are preferably calculated in each case on the basis of the virtual electromagnetic fields of the one or more first virtual models. The virtual total electromagnetic fields in the one or more second zones are preferably calculated in each case on the basis of the virtual electromagnetic fields of the one or more second virtual models. In particular, one or more first motifs assigned to the one or more first virtual models hereby become partially or completely detectable for an observer and/or a sensor when the substrate is bent or curved according to the curvature progression of the one or more first zones. One or more second motifs assigned to the one or more second virtual models preferably become partially or completely detectable for an observer and/or a sensor when the substrate is bent or curved according to the curvature progression of the one or more second zones.

The one or more first motifs preferably display to an observer at least one section of a larger motif or of a total motif when the substrate is bent or curved according to the curvature progression of the one or more zones, wherein the total motif comprises in particular one or more motifs, preferably one or more first and/or second motifs.

It is further possible for the virtual total electromagnetic fields in the one or more first zones to be calculated in each case on the basis of the virtual electromagnetic fields of the one or more first virtual models and/or for the virtual total electromagnetic fields in the one or more second zones to be calculated in each case on the basis of the virtual electromagnetic fields of the one or more second virtual models such that a first portion of the one or more first motifs assigned to the one or more first virtual models and/or that a second portion of the one or more second motifs assigned to the one or more second virtual models is detectable for an observer and/or for a sensor when the substrate is bent or curved, in particular according to the curvature progression of the one or more zones, first zones and/or second zones, and/or is not, in particular partially, detectable for an observer and/or for a sensor in the flat or unbent or non-curved state of the substrate, in particular according to the curvature progression of the one or more zones, first zones and/or second zones, wherein the one or more first motifs preferably generate a first total motif comprising the first portion of the one or more first motifs and/or the one or more second motifs preferably generate a second total motif comprising the second portion of the one or more second motifs.

It is also possible for the first total motif and/or the second total motif to form the total motif.

The virtual total electromagnetic fields in the one or more first zones are preferably calculated in each case on the basis of the virtual electromagnetic fields of the one or more first virtual models. In particular, the virtual total electromagnetic fields in the one or more second zones are calculated in each case on the basis of the virtual electromagnetic fields of the one or more second virtual models. In particular, one or more first motifs assigned to the one or more first virtual models hereby become partially or completely detectable for an observer and/or a sensor when the substrate is aligned according to the alignment of the one or more first zones. In particular, the one or more second motifs assigned to the one or more second virtual models become partially or completely detectable for an observer and/or a sensor when the substrate is aligned according to the alignment of the one or more second zones.

Two or more of the zones are preferably assigned in each case to one of the virtual hologram planes. The virtual total electromagnetic fields in the one or more zones are preferably calculated in each case on the basis of the virtual electromagnetic fields of the one or more zones. In particular, when the substrate is tilted and/or rotated one or more of the virtual models hereby become partially or completely detectable by an observer and/or by a sensor as a sequence of one or more motifs assigned to the one or more virtual models. The sequence of one or more motifs assigned to the one or more virtual models has in particular a parallactic movement effect or an orthoparallactic movement effect or a combination of a parallactic movement effect and an orthoparallactic movement effect.

By "parallactic movement effect" is meant in particular an optical movement effect in which an observer and/or a sensor detects the apparent change in position of one or more of the motifs, wherein the substrate is tilted and/or rotated in the same direction along which the optical movement effect is detectable.

By "orthoparallactic movement effect" is meant in particular an optical movement effect in which an observer and/or a sensor detects the apparent change in position of one of several of the motifs, wherein the substrate is tilted and/or rotated in a direction which is perpendicular to the direction along which the optical movement effect is detectable.

An anti-parallactic movement effect is also realizable in which the substrate tilted to the right but the object appears to move to the left.

Studies have shown that an observer and/or a sensor can detect stronger optical movement effects of one or more of the motifs when the substrate is tilted and/or rotated the further the virtual models assigned to the motifs are spaced apart from the corresponding virtual hologram plane or the corresponding virtual hologram planes. The motifs preferably float at a distance from the respective assigned virtual hologram plane of between 0.01 mm and 30 mm, in particular between 0.1 mm and 10 mm, and in particular between 0.5 mm and 5 mm, when the substrate is tilted and/or rotated.

In particular, the optical effect of the provided hologram depends, among other things, on the roughness of the substrate to which it is preferably applied. The rougher the substrate is, the more washed-out the provided hologram in particular, or preferably the motifs of the hologram, appears. The provided hologram preferably is or has been calculated such that the influences of the roughness of the substrate on the optical effect are preferably compensated for in advance. This advance compensation can be achieved, among other things, in particular through a reduction in the distance of the motifs from the virtual hologram plane.

In an alternative embodiment it is possible to create a hologram without movement effect. Here, for each viewing angle the same perspective of the object is used for different viewing directions. This produces the illusion of a static motif for the observer.

One or more of the virtual models are preferably partially or completely detectable by an observer and/or by a sensor as a sequence of one or more motifs assigned to the one or more virtual models when the substrate is tilted and/or rotated. One or more of the motifs preferably have different or identical movement speeds and/or different or identical movement directions. In particular, the distance between one or more of the virtual motifs, in particular preferably the geometric centroids of one or more of the virtual motifs, and the plane spanned by the substrate is preferably between −30 mm and +30 mm, preferably between −15 mm and +15 mm, in particular preferably between −10 mm and +10 mm, further preferably between −5 mm and +5 mm and still further preferably between −3 mm and +3 mm.

One or more motifs assigned to one or more of the virtual models are preferably partially or completely detectable by an observer and/or by a sensor from different observation directions. In particular, the motifs are assembled to form a grid of dots and/or strips, in particular a linear barcode or a 2D barcode, preferably a QR code (QR=Quick Response), when observed from the different observation directions. One or more of the dots or one or more of the strips are preferably arranged in each case at different distances from the plane spanned by the substrate, in particular arranged above and/or underneath and/or within the plane spanned by the substrate.

By "barcode" is meant in particular a sequence of machine-readable regions having different lateral dimensions, such as e.g. strips, pixels and gaps arranged in between. Here, one or more items of information, in particular binary information, can be encoded in the sequence of regions and gaps. For example, barcodes are read and/or electronically processed with optical readers, in particular cameras containing CCD chips, preferably with smartphone cameras, barcode readers or scanners.

By "QR code" is meant in particular a sequence, running in two directions, of machine-readable first regions having different lateral dimensions, which provide a first color, and second regions, which provide a second or no color. Here, one or more items of information, in particular binary information, can be encoded in the two-dimensional sequence of first and second regions. The first regions are preferably white and the second regions preferably contrast that, in particular are darker than the first regions. In particular, the first and second regions are in each case square and/or rectangular.

For example, barcodes and/or QR codes are read and/or electronically processed with optical readers, in particular cameras containing CCD chips, preferably with smartphone cameras, barcode readers or scanners.

It is possible for one or more parts of the grid of dots and/or strips, in particular of a barcode, preferably of a QR code, to be able to be detected by an observer and/or by a sensor from two or more different angles, wherein the grid of dots and/or strips in the electronic processing is assembled from the different angle-dependent acquisitions of the grid of dots and/or strips in order to check and verify the authenticity of a security element or security document having the grid of dots and/or strips.

It is further possible to arrange two or more virtual models at different distances from each other and/or from the virtual hologram plane or planes during the calculation with respect to one or more of the virtual hologram planes. A hologram is hereby preferably provided the motifs of which, when the substrate which has the provided hologram is tilted and/or rotated, provide different movement speeds according to the different distances of the virtual models from each other during the calculation of the hologram and/or with respect to the virtual hologram planes. In particular, an observer and/or a sensor detects different motifs or arrangements of motifs from different viewing directions of the provided hologram and/or at different tilt angles and/or angles of rotation of the provided hologram. Through its high complexity, such a provided hologram provides an optically variable movement effect which is to be imitated only with extreme difficulty for a forger.

Studies have shown that an easy identification or also verification of an aforementioned provided hologram is possible with a smartphone or another mobile device or also a stationary device with a camera. For example, the hologram can be calculated from the view of the camera of the smartphone taking into account the camera geometry and camera lens system as well as the camera flash as a virtual light source depending on the position, the distance from and the alignment relative to the hologram and compared with a real detection of the provided hologram. If a sufficiently good match between the calculated image of the hologram and the real image of the hologram is found by a program, in particular software, on the smartphone, the authenticity of the security document which comprises the provided hologram can be verified.

In an alternative embodiment, the hologram can be designed such that the motif is not or is barely recognizable for the human observer and/or the sensor in the case of undirected illumination. For this, the object used in the calculation of the hologram is preferably a two-dimensional—i.e. flat—object, such as a motif, for example an icon, one or two or more letters, a logo or also a barcode, which in particular preferably has a virtual distance from the virtual hologram plane of more than 10 mm, in particular more than 20 mm and further preferably more than 40 mm and still further preferably more than 100 mm. The software of the smartphone can now capture two images of such a hologram. One without illumination with the camera flash as light source and one with illumination with the camera flash. The illumination with the camera flash is a strongly directed illumination, under which the motif is recognizable. In the case of illumination without the camera flash diffuse—i.e. undirected—illumination prevails, which is why the motif is not or is only barely recognizable. On the one hand the software checks using suitable pattern recognition whether in the image which was captured with illumination with the camera flash the motif is present in the region of the hologram. On the other hand it checks whether in the image without illumination this motif is not present well enough to rule out imitations, e.g. with a printed version of the motif. In the described manner, an easy identification or also verification of an aforementioned provided hologram is likewise possible with a smartphone or with another mobile device or also with a stationary device with a camera.

In particular, the distance from the smartphone to the security document which comprises the provided hologram is between 5 cm and 50 cm, preferably between 20 cm and 30 cm, in particular preferably between 23 cm and 27 cm.

One or more motifs, which are assigned in each case to one of the virtual models, are preferably detectable by a sensor and/or an observer of the provided hologram.

One or more motifs from a first quantity of motifs are preferably detectable for an observer and/or a sensor when the substrate is arranged flat or not curved. In particular, one or more motifs from a second quantity of motifs are partially or completely detectable for an observer and/or sensor when the substrate is bent or curved according to the curvature progression or one of the virtual hologram planes in the or in one of the zones. The motifs from the first quantity of motifs and the motifs from the second quantity of motifs are preferably partially or completely different. The combination of the first and second motifs preferably yields a meaning detectable for an observer. For example, a denomination sign (e.g. "€" or "$") can be recognizable as first motif in the case of a flat arrangement of the substrate and a numeral of value (e.g. "50") of a banknote can be recognizable as second motif when the substrate is bent or curved. The first motif and the second motif have in particular a connection in terms of meaning, such as the denomination and the associated numeral of value in this example.

One or more motifs from a third quantity of motifs preferably partially or completely provide a parallactic movement effect detectable by an observer and/or by a sensor when the substrate is tilted and/or rotated. One or more motifs from a fourth quantity of motifs preferably provide an orthoparallactic movement effect detectable by an observer and/or by a sensor when the substrate is tilted and/or rotated. In particular, the motifs from the third quantity of motifs and the motifs from the fourth quantity of motifs are partially or completely different.

One or more motifs from a fifth quantity of motifs preferably have the same spatial distances or different spatial distances from one or more motifs from a sixth quantity of motifs. In particular, the motifs from the fifth quantity of motifs and the motifs from the sixth quantity of motifs are partially or completely different.

One or more motifs from a seventh quantity of motifs and/or one or more motifs from an eighth quantity of motifs preferably overlap each other completely or partially. One or more motifs from the seventh quantity of motifs and/or one or more motifs from the eighth quantity of motifs are preferably completely or partially separated from each other spatially. In particular, the motifs from the seventh quantity of motifs and the motifs from the eighth quantity of motifs are partially or completely different.

The one or more motifs assigned to one or more of the virtual models preferably appear white when viewed perpendicular to the plane spanned by the substrate, in particular when viewed perpendicularly by an observer and/or a sensor. For example, the one or more motifs assigned to one or more of the virtual models are detectable, preferably by an observer and/or a sensor, in the color blue at a viewing angle of from 30° to 34° with respect to the angle of incidence of the light with a wavelength of from 440 nm to 460 nm, and/or detectable, preferably by an observer and/or a sensor, in the color green at a viewing angle of from 38° to 42° with respect to the angle of incidence of the light with a wavelength of from 530 nm to 550 nm, and/or detectable, preferably by an observer and/or a sensor, in the color red at a viewing angle of from 49° to 53° with respect to the angle of incidence of the light with a wavelength of from 640 nm to 660 nm.

The color of the one or more motifs assigned to one or more virtual models preferably changes when the substrate is tilted and/or rotated.

The one or more motifs assigned to one or more of the virtual models are preferably assembled to form a true-color image from at least one red motif of a first virtual model, at least one green motif of a second virtual model and/or at least one blue motif of a third virtual model.

By "true-color image" is meant in particular a provided hologram which displays an assigned true color at least in regions when illuminated when viewed in reflected light and/or in transmitted light.

By "true color" is meant in particular here a color which can be formed in particular by color mixing of one or more spectral colors. A true-color image displays a true color at least in regions when illuminated.

The intensities of the at least one red, of the at least one green and/or of the at least one blue motif of the correspondingly assigned first, second and third virtual models are preferably weighted in each case according to the progression of the spectrum of the incident light and/or the progression of the response function of the human eye.

By "response function of the human eye" is meant in particular the function which describes how the color of entering radiation in a particular frequency range or in a particular wavelength range transforms into a detected or perceived color in the eye.

In one or more zones, in particular in all zones, in each case, a virtual total electromagnetic field is preferably calculated on the basis of the sum of two or more, in particular all, of the virtual electromagnetic fields in the respective zone multiplied by one or more complex conjugate virtual reference fields of one or more virtual reference light sources in the one or more zones.

One or more of the virtual reference fields preferably simulate an anisotropic or non-isotropic illumination of the 2D model and/or of the 3D model. One or more of the virtual reference fields preferably simulate the illumination with one or more reference light sources assigned to the one or more virtual reference fields.

The propagation direction of one or more of the virtual reference fields preferably has an angle of between 10° and 50°, in particular between 15° and 45°, further preferably 30° to 40° relative to the surface normal or relative to the average surface normal of one or more of the virtual hologram planes. In particular, the beam cone of one or more of the virtual reference light sources has an opening angle of between 0 and 45°, further preferably 0° and 15°. One or more of the virtual reference light sources preferably have a spacing from one or more of the virtual hologram planes of between 0.01 m and 10 m, further preferably 0.1 m and 2 m and in particular preferably 0.2 m and 1 m. In a preferred embodiment the virtual reference light source is spaced infinitely far apart from the hologram plane. In this case the reference light source radiates plane waves onto the hologram plane.

By "propagation direction" is meant in particular the direction of propagation of an electromagnetic wave, in particular the direction of propagation of each of the one or more virtual electromagnetic fields, in particular the direction of propagation of each of the one or more virtual reference fields.

By "beam cone" is meant in particular a solid angle into which an electromagnetic wave, in particular one or more of the virtual electromagnetic fields, preferably one or more of the virtual reference fields, propagates.

The reference field is preferably utilized to compensate for the solid angle at which the provided hologram is detected by an observer and/or a sensor, for the normal illumination and/or for the compensation of non-ideal illumination, such as for example the illumination with a torch or the display or the LED light (LED=Light Emitting Diode) of a smartphone or mobile telephone or of another mobile device or also a stationary device with a camera and an illumination device, preferably from a distance of from 15 cm to 35 cm. Without the utilization of a reference field the provided hologram is detectable for an observer and/or a sensor only from an observation direction which is arranged parallel to the surface normal spanned by the virtual hologram plane. The provided hologram in these cases has a strongly achromatic color impression.

One or more ranges of solid angles, in particular the entire range of solid angles, in which one or more of the motifs are completely or partially detectable by an observer and/or by a sensor, are preferably arranged symmetrically around the surface normal, in particular around the average surface normal, of the hologram plane. One or more of the ranges of solid angles preferably span a range of angles of from 0° to 30°, preferably from 0° to 20°, in particular preferably from 0° to 15°, relative to the surface normals, in particular relative to the average surface normal.

By "average surface normal" is meant the average value of the surface normal at every point on a curved curve or on one or more partial regions of a curved curve.

It is further possible for the provided hologram to have one or more of the motifs, wherein the motifs are detectable by an observer and/or a sensor only when illuminated with an almost collimated light source, in particular with a collimated light source. When illuminated with diffusely emitting light sources or with a plurality of extended light sources (for example fluorescent tubes), on the other hand, the provided hologram appears in particular as a washed-out surface. A light source emitting in an almost directed manner is for example an LED ceiling light or an LED light of a smartphone or of another mobile device or also a stationary device with a camera and/or an illumination device. During the calculation of the provided hologram it is advantageous that the distances of the virtual models corresponding to the motifs from one or more of the virtual hologram planes is greater than 10 mm, in particular greater than 20 mm, preferably greater than 40 mm and particularly preferably greater than 100 mm. The optical effect of the provided hologram depends, among other things, in particular on the roughness of the substrate to which it is preferably applied. The rougher the substrate is, the more washed-out the provided hologram in particular, or preferably the motifs of the hologram, appears. The provided hologram is now preferably calculated in particular such that the influences of the roughness of the substrate on the optical effect are preferably compensated for in advance. This advance compensation can be achieved, among other things, in particular through a reduction in the distance of the motifs from the virtual hologram plane.

By a "collimated light source" is preferably meant at least one light source and/or at least one radiation source which radiates and/or emits light or electromagnetic radiation, preferably from one or more portions of the infrared, visible and/or ultraviolet spectrum of electromagnetic radiation, wherein the propagation directions and/or the directions of propagation and/or the movement directions of one or more portions of the electromagnetic radiation and/or two or more or all electromagnetic waves of the electromagnetic radiation and/or two or more or all photons of the electromagnetic radiation differ from each other and/or from a predetermined direction by an angle of and/or by an average angle of and/or from the predetermined direction by less than 10°, in particular of or by less than 5°, preferably of or by less than 1°, further preferably do not differ from each other and/or are aligned parallel to each other.

Such a provided hologram optimized for illumination with almost collimated light sources is preferably gridded in a design, in particular in a Kinegram® or a Trustseal®. It is hereby achieved that only the design is detectable by an observer and/or a sensor under all illuminations with light sources that are not almost collimated, and the provided hologram appears matte and/or washed-out for an observer and/or a sensor. When the provided hologram gridded in the design is illuminated with an almost collimated light source, the one or more motifs of the provided hologram are preferably detectable by an observer and/or a sensor at different distances from the substrate which comprises the design and the provided hologram.

Such a provided hologram optimized for illumination with almost collimated light sources is preferably present as at least one design element. For example, it can be provided with a 100% area percentage in an eye of a design element in the form of a lion. When illuminated with a collimated light source the provided motif preferably appears only in the eye of the lion. In particular, the hologram is present, for example with a 50% area percentage, gridded in the entire design. When illuminated with a collimated light source the provided motif preferably appears in the entire design. Here, the one or more motifs and/or the provided motif preferably appears repetitively, in particular also repetitively. For example, a design comprises one or more design elements. It is also possible for a design to comprise in particular one design element.

In particular, it is possible for the virtual total electromagnetic fields in the one or more first zones to be calculated in each case on the basis of the virtual electromagnetic fields of the one or more first virtual models and/or for the virtual total electromagnetic fields in the one or more second zones to be calculated in each case on the basis of the virtual electromagnetic fields of the one or more second virtual models such that one or more first motifs assigned to the one or more first virtual models and/or that one or more second motifs assigned to the one or more second virtual models, in particular according to the curvature progression of the one or more zones, first zones and/or second zones, are not detectable for an observer and/or for a sensor, in particular when illuminated with non-collimated light, preferably under diffuse illumination, and/or are detectable for an observer and/or for a sensor, in particular when illuminated with collimated light, preferably when illuminated with an LED light, in particular preferably when illuminated with an LED light of a smartphone.

It is possible for one or more or all of the motifs to move depending on the viewing angle and tilt angle of the provided hologram optimized for illumination with almost collimated light sources and/or for one or more or all of the motifs to disappear depending on the viewing angle and tilt angle of the provided hologram optimized for illumination with almost collimated light sources. In particular, no movement of the motifs is detectable if the diameter of the solid angle detected by the observer and/or the sensor is smaller than 20°, preferably smaller than 10°. The motifs preferably appear and disappear depending on the tilt angle. It is possible for no movement of the motifs at all to be detectable for an observer and/or a sensor depending on the tilt angle of the substrate which comprises at least the provided hologram.

During the calculation of the height profile of the hologram one or more of the phase images are preferably transformed, in particular linearly transformed, into one or more assigned height profiles. The height profile of the provided hologram is preferably calculated by means of superimposition and/or gridding of the height profiles assigned to the one or more phase images.

One or more of the assigned height profiles are preferably incorporated into a substrate to provide the hologram. In particular, the assigned height profiles are preferably present in the substrate superimposed and/or gridded.

The assigned height profiles and/or the height profile of the provided hologram are or is preferably encoded as a grayscale image. In particular, the grayscale values are assigned height values, in particular standardized height values. The grayscale values and/or height values preferably have a minimum height value of 0 and a maximum height value of 27.

It is further possible to standardize the grayscale values and/or the height values to any desired minimum and maximum height values, wherein the respective maximum height value is greater than the respective minimum height value.

The difference between the minimum height value of the height profile incorporated into the substrate and the maximum height value of the height profile incorporated into the substrate preferably corresponds to an optical path difference of half or a multiple of half of a reference wavelength, in particular in the case of the formation of the provided hologram as a reflection hologram.

In particular, the difference between the minimum height value of the height profile incorporated into the substrate and the maximum height value of the height profile incorporated into the substrate corresponds to an optical path difference of a reference wavelength or a multiple of a reference wavelength, preferably in the case of the formation of the provided hologram as a transmission hologram.

The assigned height profiles and/or the height profile of the provided hologram are or is preferably incorporated into the substrate, in particular into a substrate having a photoresist layer, by means of a method selected from: laser beam lithography and electron beam lithography. In both methods the grayscale image encoding the height profile is written into a resist layer by variation of the intensity of the beam used. The height profile is provided in the resist layer after development of the exposed resist layer.

The assigned height profiles and/or the height profile of the provided hologram are or is preferably incorporated into the substrate by means of a replication method, in particular by means of thermal replication or UV replication.

The assigned height profiles and/or the height profile of the provided hologram are or is preferably incorporated into a film, in particular into a film having at least one metal layer and/or one transparent high or low refractive index layer, by means of the methods electroplating, recombination and roll-to-roll replication. A layer with a high refractive index, in particular with a refractive index above 1.5, is called a high refractive index layer here. A layer with a low refractive index, in particular with a refractive index below 1.5, is called a low refractive index layer here. In particular, the film has an HRI layer (HRI=High Refractive Index). The metal layer and/or high or low refractive index layer is usually applied to the height profile or profiles on the film after the roll-to-roll replication step.

The height profile or profiles can also be combined with further layers, in particular can be embedded between these further layers. Such further layers can protective layers, adhesion-promoter layers, adhesive layers, barrier layers, decorative layers, reflective layers.

The layers can be arranged detachably or non-detachably on a carrier substrate (for example made of polyester, in particular PET).

One or more of the decorative layers have for example one or more of the following layers:

One or more of the decorative layers preferably have one or more metallic layers, which are preferably provided in the security element in each case not over the whole surface but only partially. The metallic layers here can be formed opaque, translucent or semi-transparent. The metallic layers here are preferably formed of different metals which have clearly different reflection and/or transmission spectra. For example, the metal layers are formed of aluminum, copper, gold, silver, chromium, tin or an alloy of these metals. Furthermore, the metallic regions can be designed gridded and/or with locally different layer thicknesses.

The one or more metal layers here are preferably structured patterned in such a form that they comprise one or more image elements, in which the metal of the metal layer is provided, and comprise a background region, in which the metal of the metal layers is not provided. The image elements here can preferably be formed in the form of alphanumeric characters, but also of graphics and complex representation of objects.

One or more of the decorative layers further comprise in particular one or more color layers, in particular transparent inks. These color layers are preferably color layers which are applied by means of a printing method and which have one or more dyes and/or pigments which are embedded in a binder matrix. The color layers, in particular inks, can be transparent, clear, partially scattering, translucent or non-transparent or opaque.

Further, one or more of the decorative layers preferably have one or more optically active relief structures, which are preferably incorporated in each case into the surface of a replicated varnish layer. These relief structures are preferably diffractive relief structures, such as for example holograms, diffraction gratings, Fresnel freeform surfaces, diffraction gratings with symmetrical or asymmetrical profile shapes and/or zero-order diffraction structures. These relief structures can also be isotropic and/or anisotropic scattering matte structures, blazed gratings and/or relief structures acting substantially in reflection and/or in transmission, such as for example microlenses, microprisms or micromirrors.

One or more of the decorative layers have in particular one or more liquid crystal layers, which, depending on the alignment of the liquid crystals, generate on the one hand a reflection and/or transmission of the incident light dependent on the polarization of the incident light and on the other hand a wavelength-selective reflection and/or transmission of the incident light.

By "HRI layer" is meant in particular a layer with a high refractive index which consists for example completely or partially of $TiO_2$ or ZnS or consists of a vapor-deposited layer of a metal oxide, metal sulfide, titanium dioxide, etc. In particular, an HRI layer has a layer thickness of from 10 nm to 150 nm.

The assigned height profiles and/or the height profile of the provided hologram are or is preferably incorporated into a thin-film structure, in particular into a Fabry-Perot layer structure. The thin-film structure is typically applied to the replicated height profile of the hologram. The Fabry-Perot layer structure preferably has at least one first semi-transparent absorber layer, at least one transparent spacer layer and at least one second semi-transparent absorber layer or an opaque reflective layer.

By "thin-film structure" is meant in particular a structure of thin-film elements which generates a color shift effect dependent on the angle of view based on an arrangement of layers which has an optical depth in the region of a half wavelength ($\lambda/2$) or a quarter wavelength ($\lambda/4$) of the incident light or of the incident electromagnetic wave, in particular of the incident virtual electromagnetic field. Constructive interference in an interference layer with a refractive index n and a thickness d is calculated as follows:

$$2nd\cos(\theta)=m\lambda,$$

wherein $\theta$ is the angle between the illumination direction and the viewing direction, $\lambda$ is the wavelength of the light and m is a whole number. These layers preferably comprise a spacer layer, in particular arranged between an absorption layer and a reflective layer, or are preferably formed of a layer comprising thin-film pigments.

By "semi-transparent" is meant in particular a transmittance in the infrared, visible and/or ultraviolet wavelength range which is between 10% and 70%, preferably between 10% and 50%, wherein preferably a not insignificant portion of the incident electromagnetic waves, in particular of the incident light, is absorbed.

The first semi-transparent absorber layer preferably has a layer thickness of between 5 nm and 15 nm. The absorber layer preferably consists of aluminum, silver, copper, tin, nickel, Inconel (corrosion-resistant nickel-based alloys from Special Metals Corporation, Huntington, W. Va., USA), titanium or chromium.

The transparent spacer layer preferably has a layer thickness of between 300 nm and 600 nm. The spacer layer preferably consists of polymer, $SiO_2$ or $MgF_2$.

The transparent spacer layer preferably consists of a printed polymer layer, which is applied in particular by means of gravure printing, slot casting or inkjet printing.

The opaque mirror layer preferably has a layer thickness of between 5 nm and 50 nm. The mirror layer preferably consists of aluminum, silver, copper, tin or chromium.

The assigned height profiles and/or the height profile of the provided hologram are or is preferably incorporated into or applied to an opaque substrate, in particular opaque paper documents or opaque paper banknotes.

By "opaque" is meant in particular that no light in the infrared, visible and/or ultraviolet wavelength range, or only an insignificant amount of light in the infrared, visible or ultraviolet wavelength range, in particular less than 10%, further preferably less than 5%, is transmitted through the opaque substrate, in particular through the opaque paper documents, preferably through the opaque paper banknotes.

The assigned height profiles and/or the height profile of the provided hologram are or is preferably incorporated into or applied to at least one window region, in particular at least one window region of an ID1 card, or a transparent substrate, in particular a transparent polymer banknote, whereby the height profile of the hologram is detectable at least from the front and back side and/or when viewed in transmitted light. The window region can in particular be a perforation in the substrate and/or an unperforated transparent region of the substrate.

By "transparent" is meant in particular a transmittance in the infrared, visible and/or ultraviolet wavelength range which is between 70% and 100%, preferably between 80% and 95%, wherein preferably an insignificant portion of the incident electromagnetic waves, in particular of the incident light, is absorbed.

By "ID1 card" is meant in particular a security document or a card with a dimension of 85.6 mm×53.99 mm, wherein the dimensions of the security document or of the card correspond to the ID1 format. In particular, the radius of security documents or cards with rounded corners is between 2.88 mm and 3.48 mm, in accordance with the specification of the ID1 format.

It is possible for the substrate to be provided with a transparent ink layer which has the function of a color filter before or after incorporation of the height profile to provide the hologram. The provision with a transparent ink layer can also not be effected until after incorporation of the height profile and application of a metal layer and/or a transparent high or low refractive index layer. For example, the transparent ink layer changes the achromatic white appearance of the provided hologram into a monochromatic appearance for an observer and/or sensor.

The hologram is preferably incorporated into the substrate by exposure of a volume hologram material, wherein the object wave starts from the height profile assigned to the hologram and/or the assigned height profiles. In particular, the assigned height profiles and/or the height profile of the hologram are or is transformed into the progression of the Bragg planes of the volume hologram generated hereby.

It is possible to incorporate the assigned height profiles and/or the height profile of the hologram into a shim and to expose this shim as a master for producing the volume hologram. The optically variable effect of the hologram is hereby transferred in particular to the volume hologram and the optically variable effect of the volume hologram is detectable for an observer and/or sensor preferably in the color of the laser light used for the illumination. In particular, the exposure of the master for producing the volume hologram is effected by one or more in particular monochromatic lasers, for example one or more red, yellow, green, turquoise or blue lasers.

Studies have shown that it is advantageous to adapt the maximum height or the maximum depth of the height profile to the wavelength of the laser which is used for the exposure of the master for producing the volume hologram. In particular, the wavelength of all of the virtual light sources, preferably all of the virtual point light sources, matches the wavelength of the laser. The difference between the minimum depth and the maximum depth or the minimum height and the maximum height of the assigned height profile incorporated into the master and/or of the height profile of the hologram preferably corresponds to half an optical wavelength or a multiple of half the optical wavelength of the laser, in particular when the master is designed as a reflection hologram.

The height profile of at least one further optically variable structure, selected from: a diffractive relief structure, in particular a diffraction grating, a Fresnel freeform lens, a zero-order diffraction structure, a blazed grating, a micromirror structure, an isotropic or anisotropic matte structure, a microlens structure, is preferably incorporated into the substrate in addition to the assigned height profiles and/or the height profile of the hologram.

The assigned height profiles and/or the height profile of the hologram are or is preferably incorporated into one or more first regions of the substrate and the height profile of the at least one further optically variable structure is incorporated in particular into one or more second regions of the substrate.

At least one or more of the second regions and one or more of the first regions preferably overlap at least partially.

The one or more first regions preferably do not overlap the one or more second regions. The one or more first regions and the one or more second regions are preferably arranged neighboring each other. The one or more first regions and the one or more second regions are further preferably arranged nested in each other and/or one of the first or second regions surrounds another of the first or second regions.

In particular, the viewing angle defines at what solid angle the provided hologram is detectable for an observer and/or a sensor. The hologram is typically recognizable close to direct reflection. By adding a reference wave during the calculation of the hologram, it is possible to bring the viewing angle away from direct reflection. The provided hologram is preferably calculated such that it is to be seen when the substrate is tilted, wherein the viewing angle with respect to the surface normal which is spanned by the plane of the substrate is between 15°±10° and 25°±10°, preferably 20°±10°. The provided hologram can also be calculated such that it is to be seen when the substrate is tilted significantly, wherein the viewing angle with respect to the surface normal is preferably between 30°±25° and 65°±25°, further preferably 20°±15° and 75°±15°, in particular preferably 10°±5° and 85°±5°.

It is possible for the light to be incident on the substrate perpendicularly, i.e. parallel to the surface normal spanned by the plane of the substrate, and for the motifs of the provided hologram hereby to be detectable by an observer and/or a sensor in particular at an oblique angle of preferably between 30°±25° and 65°±25°, further preferably 20°±15° and 75°±15°, in particular preferably 10°±5° and 85°±5°.

It is further possible for the motifs of the provided hologram to be detectable by an observer and/or a sensor from the anti-parallel or reverse direction to the direction of incidence of the light, which is preferably incident on the substrate at an oblique angle.

The provided hologram with a surface relief, e.g. a Fresnel freeform lens, gridded in each other is preferred. Here, one and the same 3D object is preferably realized in the same size with both structure types. For example, the 3D object can be a view of a mountain, e.g. the Matterhorn. The gridded or superimposed combination of the two effects yields a more complex appearance than the respective appearance of only one of the two effects. This substantially increases the effort of forging the security element which comprises the provided hologram and/or the security document which comprises the provided hologram.

Furthermore, it is possible to complete the provided hologram with Fresnel freeform lens elements, with the result that in the case of one or more of the motifs consisting of static and moving parts the static parts are designed as Fresnel freeform lens and the dynamic parts are designed as provided hologram. For example, the body of a lion, in particular including the legs, could be provided as surface relief and the head of the lion on the other hand could be provided as provided hologram. When the security element is tilted, in particular the head of the lion will provide a movement or an optically variable effect and for example rotate slightly about the axis spanned by the surface normal of the substrate, while the body of the lion is in particular static or provides only a weakly optically variable effect.

It is further possible to calculate the provided hologram such that it appears at a short distance in front of the eye of an observer and/or a sensor and is detected by the observer or the sensor, wherein the observation distance of the provided hologram is preferably between 0.1 cm and 40 cm, in particular between 1 cm and 10 cm.

The provided hologram is further calculated such that an observer and/or a sensor detects the one or more motifs of the provided hologram when the provided hologram is observed in the direction of a light source. This optical effect is akin in particular to observing a room through a keyhole.

BRIEF DESCRIPTION OF THE DRAWINGS

The invention is explained by way of example below with reference to several embodiment examples with the aid of the attached drawings. In these.

DETAILED DESCRIPTION OF THE PREFERRED EMBODIMENTS

Figure 1:
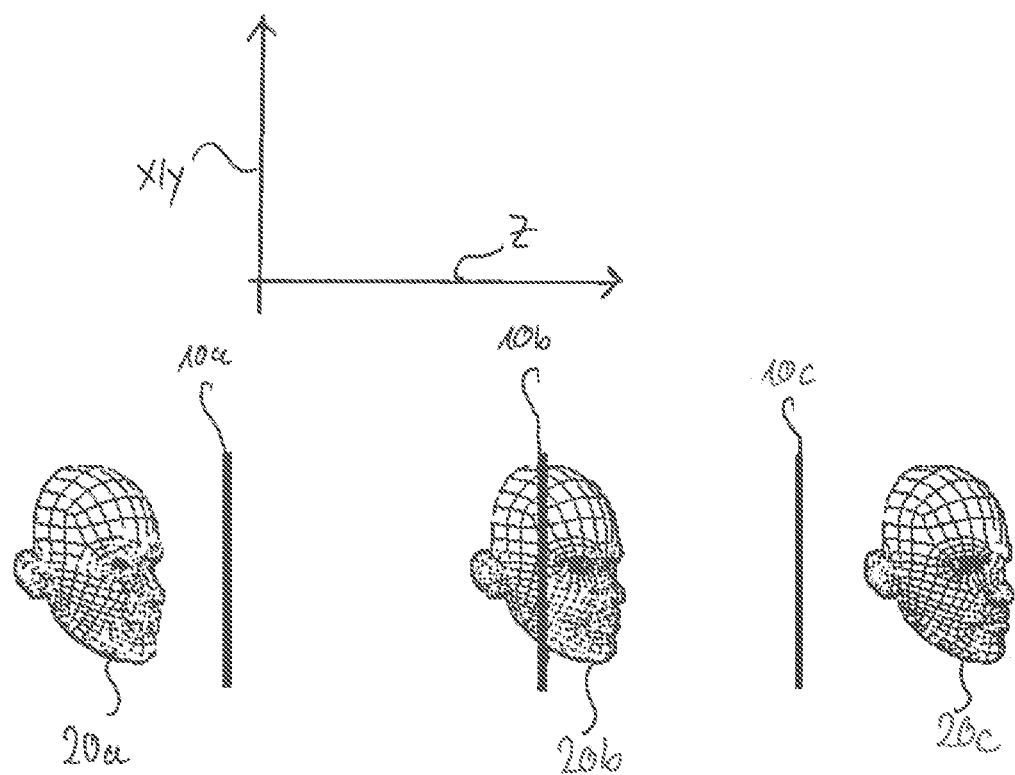
FIG. 1 schematically shows a method step
FIG. 2 schematically shows a method step

FIG. 1 shows a method step of a method for producing a hologram, in particular a hologram for security elements and/or security documents. A first virtual hologram plane 10a is arranged to the right of a first virtual model 20a with respect to a direction z. A second virtual hologram plane 10b is arranged with respect to the direction z such that the second virtual hologram plane 10b intersects the second virtual model 20b. A third virtual hologram plane 10c is arranged to the left relative to a third virtual model 20c with respect to the direction z. The first, second and third virtual hologram planes run parallel to the plane x/y.

The first, second and third virtual models 20a, 20b, 20c are akin to the surface of a human head, wherein the surface is approximated by a grid structure.

In particular, the first, second and third virtual models 20a, 20b, 20c are in each case formed as a virtual 2D model or as a virtual 3D model.

One or more virtual hologram planes 10a, 10b, 10c are preferably arranged in front of and/or behind one or more virtual models 20a, 20b, 20c and/or one or more virtual hologram planes 10a, 10b, 10c intersect in particular one or more virtual models 20a, 20b, 20c.

It is further possible to provide several models 20a, 20b, 20c on different virtual hologram planes 10a, 10b, 10c to produce a hologram.

Figure 2:
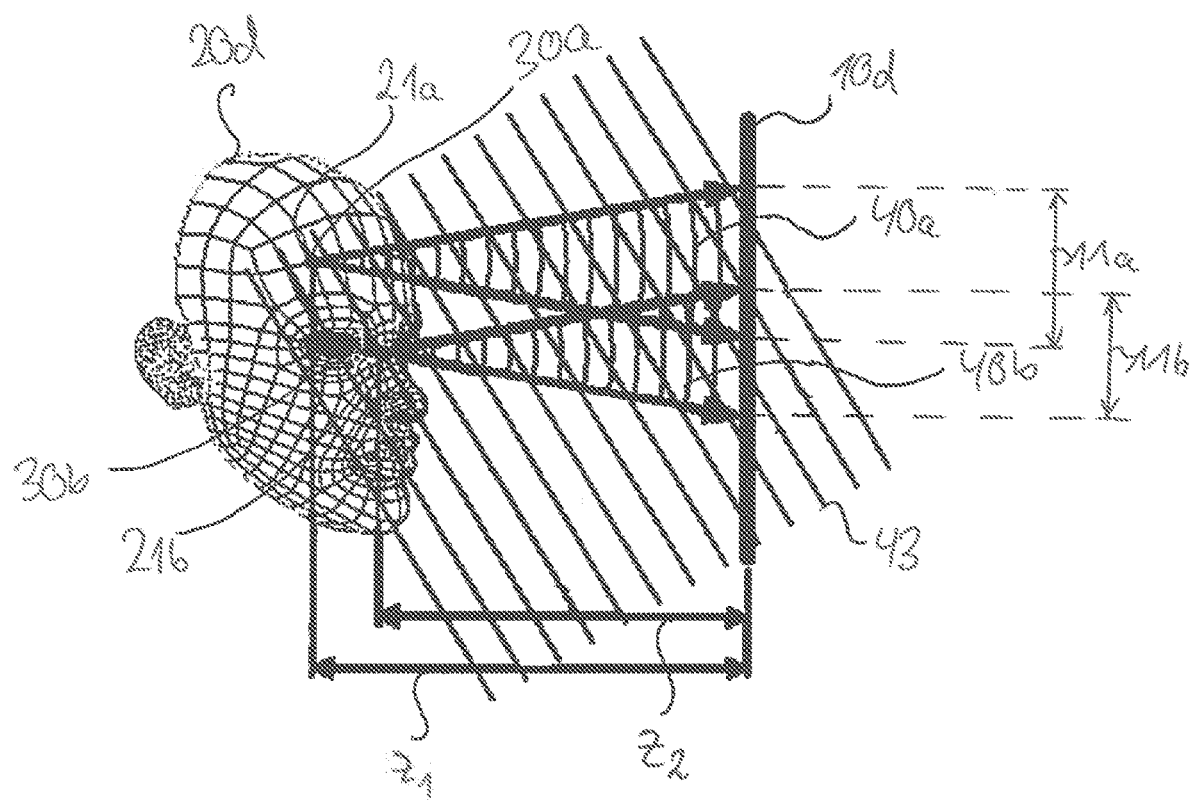

FIG. 2 shows further method steps for producing a hologram, wherein a virtual light source 30a or 30b is in each case arranged in two partial regions 21a, 21 b of the surface of a virtual model 20d, which is akin to the shape of the aforementioned models 20a, 20b, 20c, at a distance $z_1$ or $z_2$ from a virtual hologram plane 10d.

In a further method step, in each case one virtual electromagnetic field 40a, 40b starting from in each case one of the virtual light sources 30a, 30b is calculated in one or more zones 11a, 11 b of the virtual hologram plane 10d.

The virtual light sources 30a, 30b emit, in particular as virtual point light sources, virtual spherical waves anisotropically into the solid angles which intersect the virtual hologram plane in the zones 11a, 11b. Compared with an isotropic emission into all solid angles, in particular computing time and thus costs are saved, as the calculation of the anisotropic emission of the virtual electromagnetic fields 40a, 40b is much less complex.

The virtual electromagnetic fields 40a, 40b, which start from the two virtual light sources 30a, 30b, preferably have an isotropic or an anisotropic intensity distribution over one or more solid angles, in particular over the entire solid angle.

It is possible for the virtual electromagnetic fields 40a, 40b, which start from the two virtual light sources 30a, 30b, to have the same intensity and/or the same intensity distribution over the entire solid angle.

It is further possible for the virtual electromagnetic fields 40a, 40b, which start from the two virtual light sources 30a, 30b, to have different intensities and/or different intensity distributions over one or more solid angles, in particular over the entire solid angle.

A virtual electromagnetic field $U_i$ starting from an-th virtual point light source at a point $(x_i, y_i, z_i)$ is preferably calculated at a point $(x_h, y_h, z_h)$ of the at least one zone 11a or 11b, in particular by means of the equation $$U_i(x_h, y_h) = \frac{\exp(ikr)}{r}, r = \sqrt{(x_h - x_i)^2 + (y_h - y_i)^2 + z_i^2},$$

wherein the emission is effected isotropically here.

The restriction of the emission of the virtual electromagnetic fields 40a, 40b into the two zones 11a, 11 b of the virtual hologram plane 10d is preferably effected in each case by means of a virtual aperture, wherein the beam cone of the virtual light sources 30a, 30b is restricted to a solid angle of ±45°, preferably ±35°, further preferably ±25° and in particular ±15°.

In particular, the virtual light sources 30a, 30b, which are arranged in the respective partial regions of the surface 21a, 21b of the virtual model 20d, are arranged periodically on the two partial regions of the surface 21a, 21 b of the virtual model 20d in at least one direction and/or are arranged randomly or pseudo-randomly on the two partial regions of the surface 21a, 21b of the virtual model 20d in at least one direction.

The distances between the neighboring virtual light sources 30a, 30b are in particular between 5 μm and 500 μm, preferably between 10 μm and 200 μm.

The arrangement of the virtual light sources 30a, 30b is further preferably effected as a cross grid, wherein of the two virtual light sources 30a, 30b relative to each other is between 5 μm and 500 μm, in particular between 10 μm and 200 μm.

It is possible for the two virtual light sources 30a, 30b to have the form of microsymbols, in particular selected from: letter, portrait, image, alphanumeric character, character, geometric freeform, square, triangle, star, moon, circle, denomination sign, country-specific symbol (e.g. the Swiss cross, the German Federal eagle, the Canadian maple leaf), curved line or outline (e.g. a contour of country borders).

The lateral dimensions of the microsymbols on the partial regions of the surface 21a, 21b of the virtual model 20d are further preferably between 5 μm and 500 μm, in particular between 10 μm and 200 μm.

The virtual model 20d or each of the two or more virtual models 20a, 20b, 20c is preferably assigned to two or more of the virtual hologram planes 10a, 10b, 10c, 10d, and the one or more virtual electromagnetic fields 40a, 40b starting from the one or more virtual light sources 30a, 30b of the assigned virtual model 20d or of the assigned virtual models 20a, 20b, 20c are calculated in the one or more zones 11a, 11b of the respective virtual hologram plane 10a, 10b, 10c, 10d.

To calculate the one or more phase images 50, the virtual total electromagnetic fields 41 are further preferably superimposed by two of the zones 11a, 11b, in particular by two of the zones 11a, 11b, which are zones of different ones of the virtual hologram planes 10a, 10b, 10c, 10d, in particular on the basis of a predefined reference direction.

In particular, the two or more zones 11a, 11b superimposed to calculate the one or more phase images 50 overlap at least partially, preferably completely, in relation to the predefined reference direction, with the result that two or more motifs 22a, 22b, 22c, 22d provided by different zones 11a, 11b in the provided hologram 1 are preferably generated in intersecting regions of surface of the provided hologram 1 in relation to the predefined reference direction.

The two or more zones 11a, 11b superimposed to calculate the one or more phase images 50 preferably do not overlap in relation to the predefined reference direction, with the result that two or more motifs 22a, 22b, 22c, 22d provided by different zones 11a, 11b in the provided hologram 1 are preferably generated in separate regions of surface of the provided hologram 1 in relation to the predefined reference direction.

In a further method step a virtual total electromagnetic field is calculated in each case in the two zones 11a, 11b on the basis of the sum of the two virtual electromagnetic fields 40a, 40b in the respective zone 11a, 11b and a virtual reference field 43. Here, the virtual electromagnetic fields 40a, 40b in the respective zone 11a or 11b are preferably multiplied by the complex conjugate virtual reference field 43, which starts in particular from a virtual reference light source 33, and the total electromagnetic fields in the respective zone 11a or 11b are calculated.

The virtual reference field 43 preferably simulates a non-isotropic illumination of the virtual 3D model 20d, in particular the illumination with the virtual reference field 43 of the assigned reference light source 33. For example, the illumination of the virtual 3D model 20d with a torch, preferably with the LED flash of a smartphone, is simulated by means of the virtual reference field 43, wherein the distance between the light source and the virtual hologram plane 10d is in particular between 5 cm and 35 cm and preferably between 15 cm and 25 cm.

The propagation direction or the direction of propagation of the virtual reference field 43 preferably has an angle of between 10° and 50°, in particular between 15° and 45°, further preferably 30° to 40°, relative to the surface normal or relative to the average surface normal of the virtual hologram plane 10d and/or the beam cone of the virtual reference light source 33 has in particular an opening angle of between 0° and 45° degrees, further preferably 0° and 15°, and/or the virtual reference light source 33 preferably has a spacing from the virtual hologram plane 10d of between 0.01 m and 10 m, further preferably 0.1 m and 2 m and in particular preferably 0.2 and 1 m. In a preferred embodiment the virtual reference light source 33 is spaced infinitely far apart from the hologram plane 10d. In this case the reference light source 33 radiates plane waves onto the hologram plane 10d.

In a further method step one or more phase images are calculated from the virtual total electromagnetic fields in the one or more zones 11a, 11b.

In a further method step a height profile of the hologram is calculated from the one or more phase images and the height profile of the hologram is incorporated into a substrate to provide the hologram.

Figure 3:
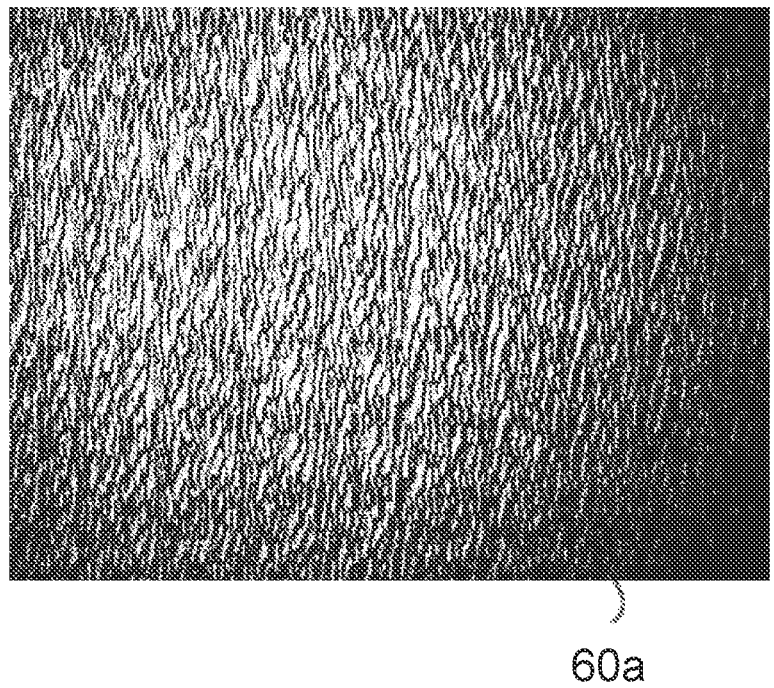
FIG. 3 shows a microscope image of a height profile
Figure 4:
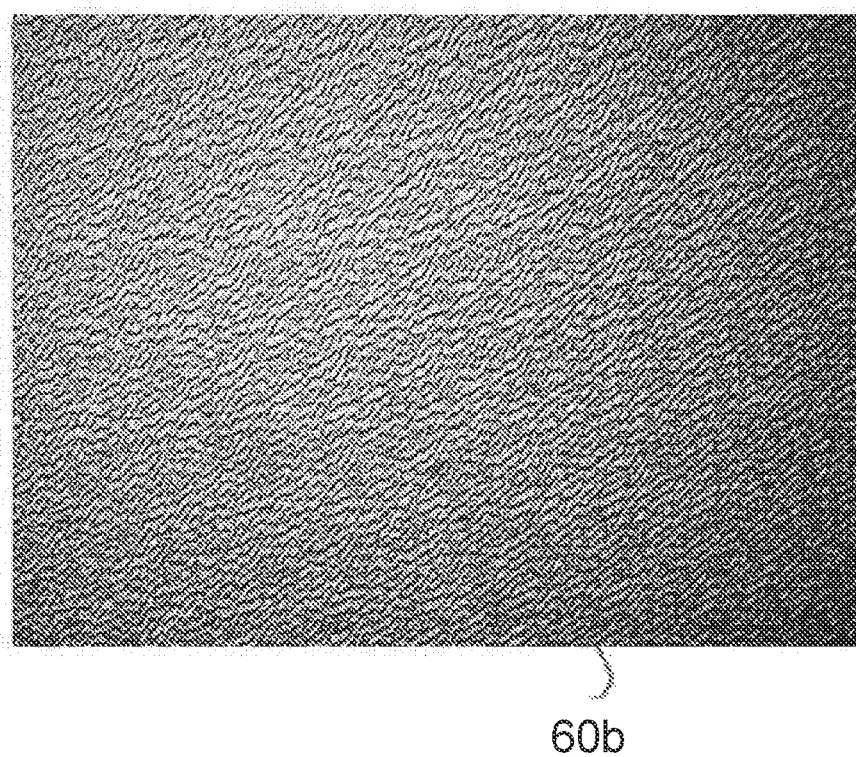
FIG. 4 shows a microscope image of a height profile

FIGS. 3 and 4 show examples of microscope images in each case of another section of a height profile 60a or 60b of the hologram. In each case the outline or the country borders of Switzerland was chosen as virtual model here.

Figure 5:
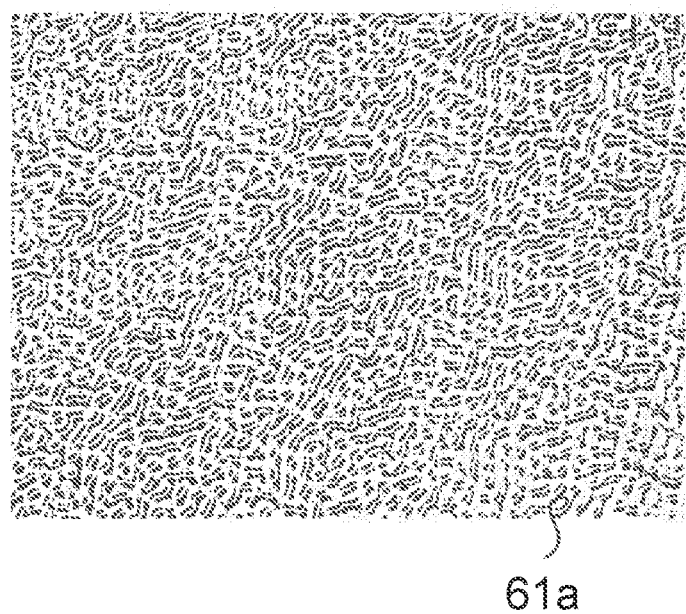
FIG. 5 shows a height profile

FIG. 5 shows a height profile incorporated into a substrate as grayscale image 61a. The underlying virtual model corresponds to the outline or the country borders of Switzerland.

During the calculation of the height profile 60a, 60b of the provided hologram one or more of the phase images are preferably transformed, in particular linearly transformed, into one or more assigned height profiles. In particular, the height profile 60a, 60b of the provided hologram is created by means of superimposition and/or gridding of the height profiles assigned to the one or more phase images.

It is possible for one or more of the assigned height profiles to be incorporated into a substrate to provide the hologram, wherein the assigned height profiles are preferably present in the substrate superimposed and/or gridded.

Figure 6:
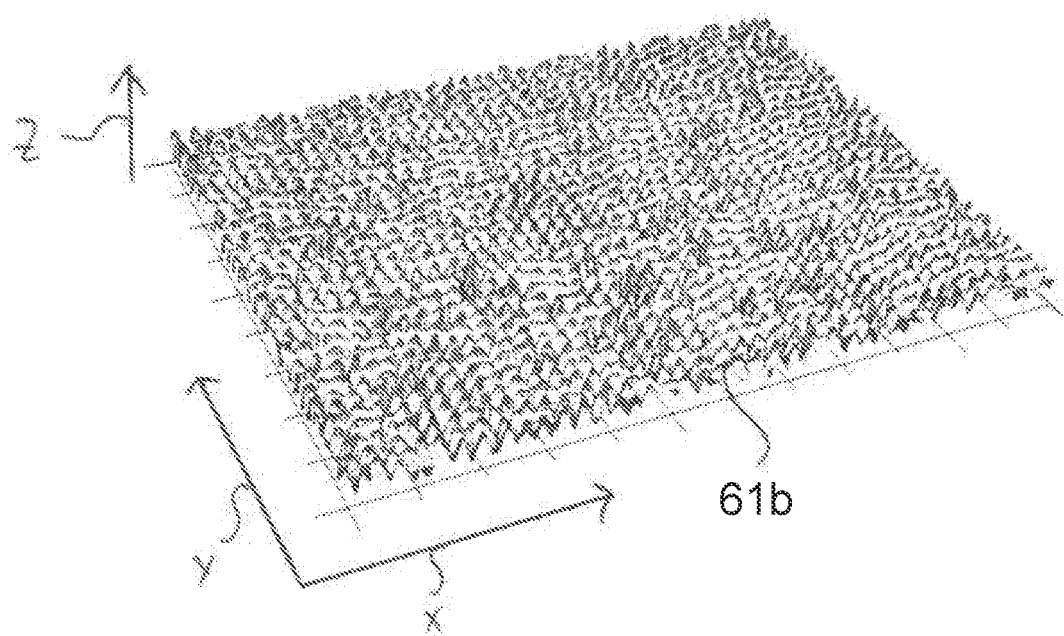
FIG. 6 shows a perspective representation of a height profile
FIG. 7 schematically shows a security document
FIG. 8 schematically shows a method step
FIG. 9 schematically shows a method step

FIG. 6 shows the height profile 61a represented in FIG. 5 as a perspective 3D view. The lateral extents of the height profile 61a in the direction x, y and y are 96 μm, 72.2 μm and 0.6 μm respectively.

The assigned height profiles and/or the height profile 60a, 60b of the provided hologram are or is preferably encoded as a grayscale image, in which the grayscale values are assigned height values, in particular standardized height values. The minimum height values preferably have a value of 0 and the maximum height values have a value of 27.

The difference between the minimum height value of the height profile 60a, 60b incorporated into the substrate and the maximum height values of the height profile 60a, 60b incorporated into the substrate preferably corresponds to an optical path difference of half or a multiple of half of a reference wavelength, wherein the provided hologram is in particular provided as a reflection hologram. For example, the reference wavelength corresponds to the wavelength of the virtual electromagnetic fields 40a, 40b.

In the case of the formation of the provided hologram as a transmission hologram, the difference between the minimum height value of the height profile 60a, 60b incorporated into the substrate and the maximum height value of the height profile 60a, 60b incorporated into the substrate preferably corresponds to an optical path difference of a reference wavelength or a multiple of a reference wavelength.

The assigned height profiles and/or the height profiles 60a, 60b of the provided hologram are preferably incorporated into the substrate, in particular into a substrate having a resist layer, in particular a photoresist layer, preferably by means of a method, selected from: laser beam lithography and electron beam lithography. In both methods the gray-scale image encoding the height profile is written into a resist layer by variation of the intensity of the beam used. The height profile is provided in the resist layer after development of the exposed resist layer.

It is further possible to incorporate the assigned height profiles and/or the height profile 60a, 60b of the provided hologram into the substrate by means of a replication method, in particular by means of thermal replication or UV replication.

In particular, the assigned height profiles and/or the height profiles 60a, 60b of the provided hologram are incorporated into a film, in particular into a film having at least one metal layer and/or one transparent high or low refractive index layer, by means of the methods electroplating, recombination and roll-to-roll replication. The film preferably has an HRI layer. The metal layer and/or high or low refractive index layer is usually applied to the height profile or profiles on the film after the roll-to-roll replication step.

The height profile or profiles can also be combined with further layers, in particular can be embedded between these further layers. Such further layers can protective layers, adhesion-promoter layers, adhesive layers, barrier layers, decorative layers, reflective layers.

Figure 7:
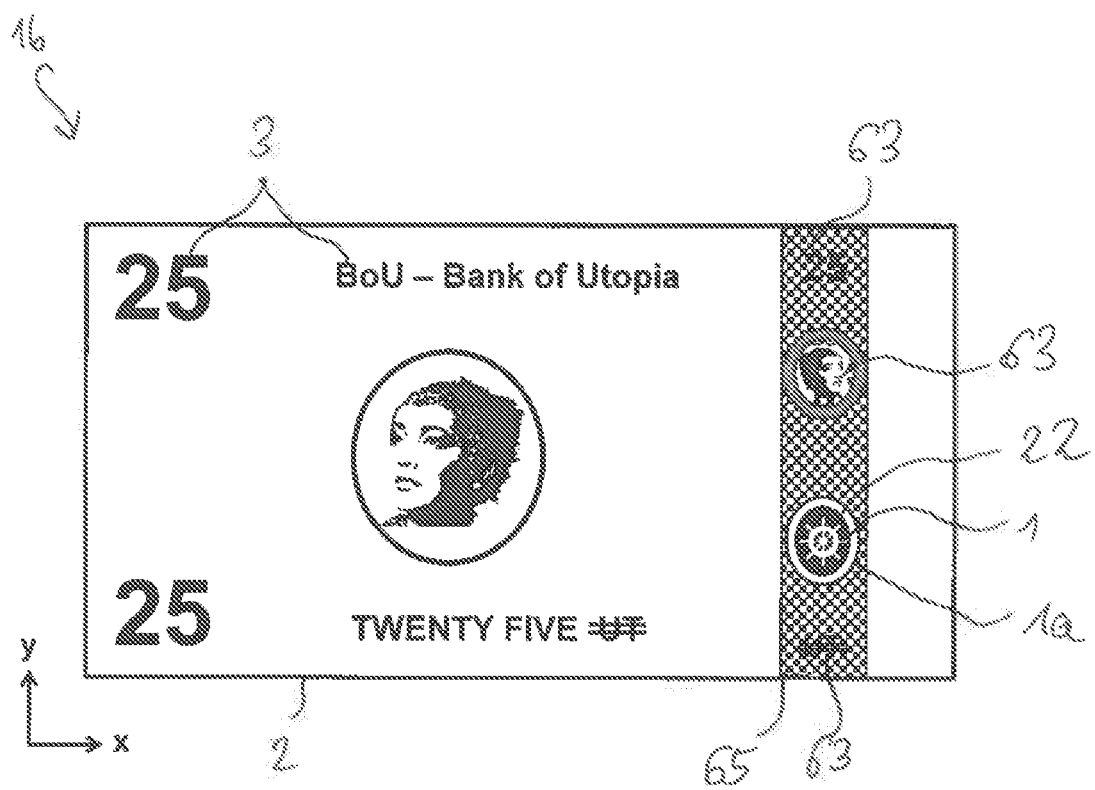

FIG. 7 shows a security document 1b comprising a substrate 2 which has a security strip 65, wherein the security strip 65 comprises three optically variable structures 63. The optically variable structures 63 are formed as the number "25", as a portrait and as a fictional denomination sign. For example, the optically variable structures "25" and are formed as surfaces lighting up diffractively when illuminated and the optical impression of the portrait which is formed as a Fresnel freeform surface becomes detectable for an observer and/or a sensor when the surface relief is illuminated.

The height profile of at least one further optically variable structure 63, in particular selected from: a diffractive relief structure, in particular a diffraction grating, a Fresnel freeform lens, a zero-order diffraction structure, a blazed grating, a micromirror structure, an isotropic or anisotropic matte structure and/or a microlens structure, are preferably incorporated into the security strip 65 in addition to the security element 1a which contains the assigned height profile and/or one or more height profiles 60a, 60b of the hologram 1.

The document body of the security document 1b is preferably formed multi-ply and comprises the substrate 2, which is formed of a paper substrate and/or plastic substrate.

The security strip 65 is preferably likewise formed multi-ply and comprises a carrier substrate (for example made of polyester, in particular PET), which can be detachable or non-detachable, and one or more polymeric varnish layers, for example a replication layer, can be replicated into the height profiles. Further, the security strip 65 can also comprise one or more protective layers and/or one or more decorative layers and/or one or more adhesive or adhesion-promoting layers and/or one or more barrier layers and/or one or more further security features.

One or more of the decorative layers have for example one or more of the following layers:

One or more of the decorative layers preferably have one or more metallic layers, which are preferably provided in the security element in each case not over the whole surface but only partially. The metallic layers here can be formed opaque, translucent or semi-transparent. The metallic layers here are preferably formed of different metals which have clearly different reflection and/or transmission spectra. For example, the metal layers are formed of aluminum, copper, gold, silver, chromium, tin or an alloy of these metals. Furthermore, the metallic regions can be designed gridded and/or with locally different layer thicknesses.

The one or more metal layers here are preferably structured patterned in such a form that they comprise one or more image elements, in which the metal of the metal layer is provided, and comprise a background region, in which the metal of the metal layers is not provided. The image elements here can preferably be formed in the form of alphanumeric characters, but also of graphics and complex representation of objects.

One or more of the decorative layers further comprise in particular one or more color layers, in particular transparent inks. These color layers are preferably color layers which are applied by means of a printing method and which have one or more dyes and/or pigments which are embedded in a binder matrix. The color layers, in particular inks, can be transparent, clear, partially scattering, translucent or non-transparent or opaque.

Further, one or more of the decorative layers preferably have one or more optically active relief structures, which are preferably incorporated in each case into the surface of a replicated varnish layer. These relief structures are preferably diffractive relief structures, such as for example holograms, diffraction gratings, Fresnel freeform surfaces, diffraction gratings with symmetrical or asymmetrical profile shapes and/or zero-order diffraction structures. These relief structures can also be isotropic and/or anisotropic scattering matte structures, blazed gratings and/or relief structures acting substantially in reflection and/or in transmission, such as for example microlenses, microprisms or micromirrors.

One or more of the decorative layers preferably have one or more interference layers, which reflect or transmit the incident light in a wavelength-selective manner. These layers can be formed for example of thin-film elements, in particular of Fabry-Perot thin-film elements, which generate a color shift effect dependent on the angle of view based on an arrangement of layers which have an optical depth in the region of a half wavelength or $\lambda/2$ (A is the wavelength of the light or the wavelength of an electromagnetic wave) or a quarter wavelength or $\lambda/4$ of the incident light. Constructive interference in an interference layer with a refractive index n and a thickness d is calculated as follows:

$$2nd \cos(\theta) = m\lambda,$$

wherein $\theta$ is the angle between the illumination direction and the viewing direction, A is the wavelength of the light and m is a whole number. These layers comprise a spacer layer, in particular arranged between an absorption layer and a reflective layer, or can preferably be formed of a layer comprising thin-film pigments.

One or more of the decorative layers have in particular one or more liquid crystal layers, which, depending on the alignment of the liquid crystals, generate on the one hand a reflection and/or transmission of the incident light dependent on the polarization of the incident light and on the other hand a wavelength-selective reflection and/or transmission of the incident light.

Further, the security strip 65 has a security element 1 comprising a provided hologram 1, wherein the security element 1 has a carrier substrate with a replication layer, into which the height profile 60 of a hologram 1 is incorporated. The hologram 1 is calculated from one or more phase images, wherein the one or more phase images are calculated from one or more virtual total electromagnetic fields 41 in one or more zones 11 of one or more virtual hologram planes 10. Each of the virtual total electromagnetic fields 41 is calculated in one or more of the zones 11 on the basis of the sum of two or more virtual electromagnetic fields 40. One or more of the virtual electromagnetic fields 40 starting from at least one virtual light source 30 are calculated in one or more of the zones 11. One or more of the virtual light sources 30 are arranged on one or more partial regions of the surface 21 of one or more virtual models 20. One or more of the virtual hologram planes 10 are arranged in front of and/or behind one or more of the virtual models 20 and/or one or more of the virtual hologram planes 10 intersect one or more of the virtual models 20.

The motif 22 of the hologram 1 is formed as a steering wheel, wherein for an observer and/or a sensor, depending on the viewing angle and/or tilt angle of the substrate 2, the motif 22 is arranged in front of and/or behind the substrate 2 and/or intersects the substrate 2. During the calculation of the provided hologram 1 the corresponding virtual model of a steering wheel is arranged in particular in front of or behind the virtual hologram plane or arranged such that the virtual model intersects the virtual hologram plane, wherein the virtual hologram plane preferably corresponds to the plane of the substrate 2. Hereby, an observer and/or a sensor detects the motif 22 of the provided hologram 1 in front of or behind the plane spanned by the substrate 2 or an observer and/or a sensor detects the motif 22 of the provided hologram such that it intersects the plane of the substrate 2. These optical effects are preferably dependent on the tilt angle and/or the viewing angle relative to the plane spanned by the substrate 2.

The distance of the motif 22 from the plane spanned by the substrate 2 or the distance of the virtual model of the steering wheel from the virtual hologram plane is between −50 mm and +50 mm, in particular between −25 mm and +25 mm, preferably between −15 mm and 15 mm.

The motif 22 is preferably selected from: letters, portraits, images, alphanumeric characters, characters, representations of landscapes, representations of buildings, geometric freeforms, squares, triangles, circles, curved lines, representation of buildings, representations of landscapes and/or outlines.

Figure 8:
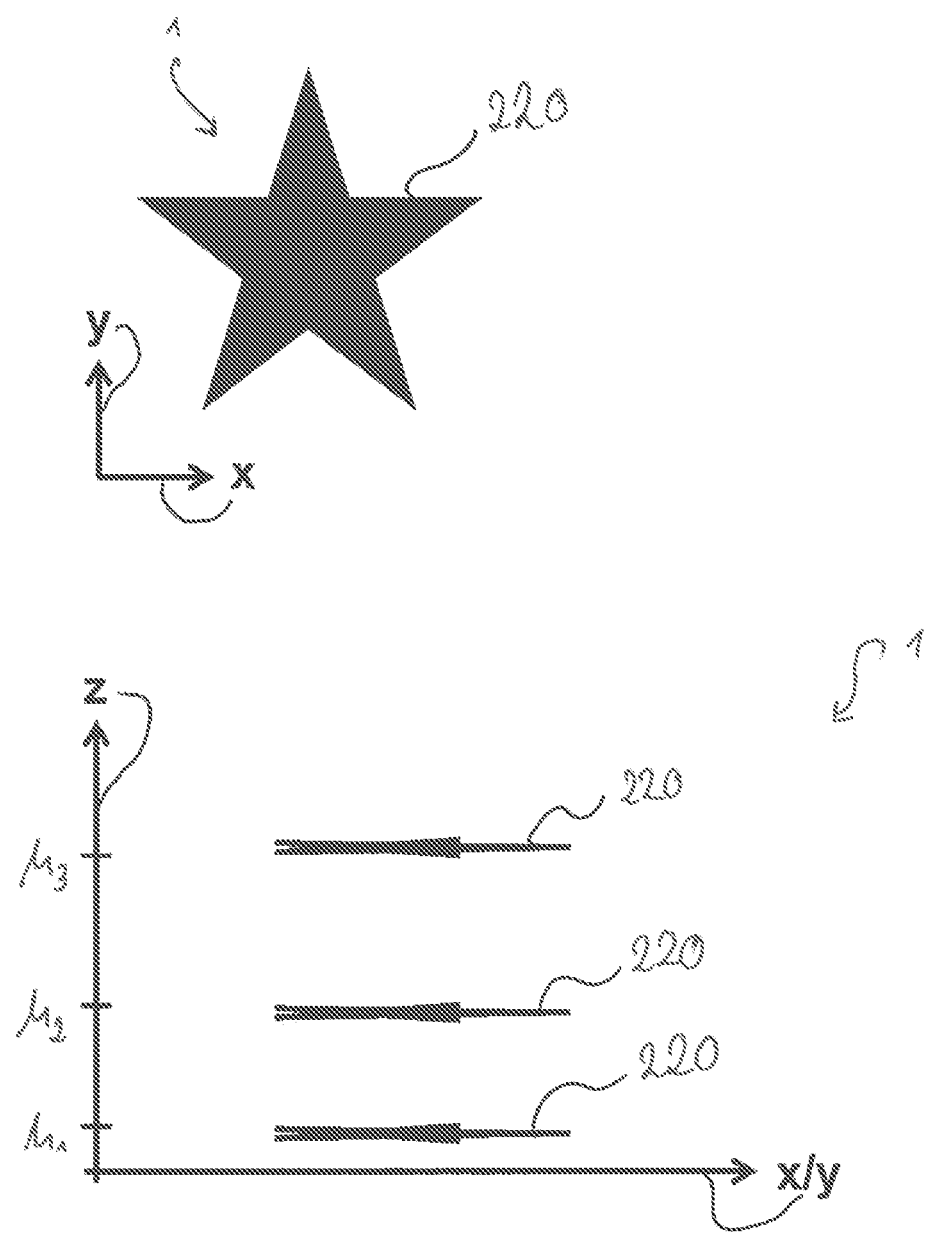

FIG. 8 shows, in the upper part of the figure, a star-shaped motif 220 of a provided hologram 1 which extends over the plane spanned by the axes x and y.

In the lower part of FIG. 8 the star-shaped motif 220 of the provided hologram 1 is detectable by an observer and/or a sensor at three different distances or heights $h_1$, $h_2$ and $h_3$ with respect to the plane x/y spanned by the substrate 2, which is spanned by the axes x and y. Here, during the calculation of the provided hologram 1 the heights $h_1$, $h_2$, $h_3$ are for example set to $h_1=3$ mm, $h_2=10$ mm and $h_3=20$ mm and defined as distances of the virtual model simulating the star-shaped motif 220 from the virtual hologram plane which simulates in particular the plane x/y.

It is further possible to restrict the solid angle during the calculation of the provided hologram 1 such that the provided hologram 1 is detectable by an observer and/or a sensor only at the restricted solid angle.

Figure 9:
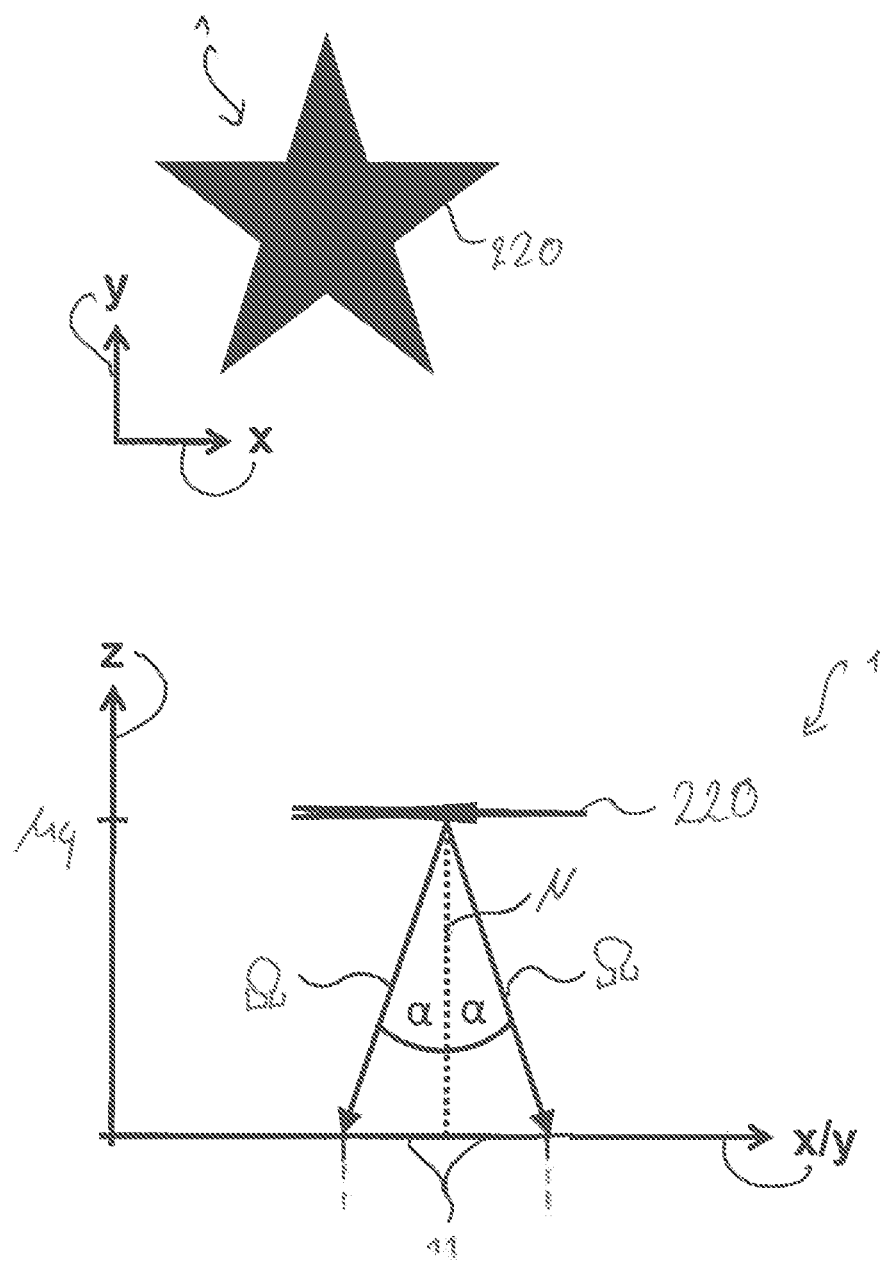

The upper part of FIG. 9 shows the star-shaped motif 220 from FIG. 8, which extends over the plane x/y spanned by the axes x and y.

The lower part of FIG. 9 shows the star-shaped motif 220 at a distance or a height ha from the plane x/y spanned by the substrate 2. Here, the virtual model simulating the star-shaped motif 220 is arranged at a distance $h_4=20$ mm from the virtual hologram plane, wherein the virtual hologram plane simulates the plane x/y during the calculation of the provided hologram.

The motif 220 is detectable for an observer and/or sensor only from the solid angle $\Omega$, which is spanned by the angle $\alpha$. The solid angle $\Omega$ is arranged symmetrically around the surface normal N of the plane x/y. During the calculation of the provided hologram 1 the solid angle $\Omega$ is restricted by a virtual aperture such that the virtual electromagnetic fields are provided only in a zone 11 on the virtual hologram plane or the plane x/y. The angle $\alpha$ lies in a range of angles of from 0° to 30°, preferably in a range of angles of from 0° to 20°, further preferably in a range of from 0° to 15°.

The assigned height profiles and/or one or more of the height profiles 60, 60a, 60b of the provided hologram 1 are preferably incorporated into a thin-film system, in particular incorporated into a Fabry-Perot thin-film system, wherein the Fabry-Perot thin-film system has at least one first semi-transparent absorption layer, at least one transparent spacer layer and at least one second semi-transparent absorption layer or an opaque reflective layer. The first semi-transparent absorption layer preferably consists of aluminum, silver, copper, tin, nickel, Inconel (corrosion-resistant nickel-based alloys from Special Metals Corporation, Huntington, W. Va., USA), titanium or chromium and/or has a layer thickness of between 5 nm and 15 nm. The transparent spacer layer preferably has a layer thickness of between 300 nm and 600 m and/or consists of polymer, $SiO_2$ or $MgF_2$. The opaque reflective layer preferably has a layer thickness of between 5 nm and 50 nm.

The transparent spacer layer preferably consists of a printed polymer layer, which is applied in particular as a varnish by means of gravure printing, slot casting or inkjet printing. Depending on the varnish which is provided for printing the polymer layer, the printed polymer layer preferably compensates for the hologram 1 provided height profile 60a, 60b replicated into the thin-film system, in particular partially, wherein the flow behavior and/or the drying behavior of the varnish determines the degree of compensation of the replicated height profiles 60a, 60b.

If a varnish is used which strongly compensates for the height profile 60a, 60b of the provided hologram 1, the color effect is strongly attenuated by interference effects in the region of the provided hologram 1 in the thin-film system for an observer and/or for a sensor and/or an observer and/or a sensor detect a mixed color, which is in particular gray. This optical effect is preferably provided as a design element, such as for example in the photograph shown on FIG. 10.

Figure 10:
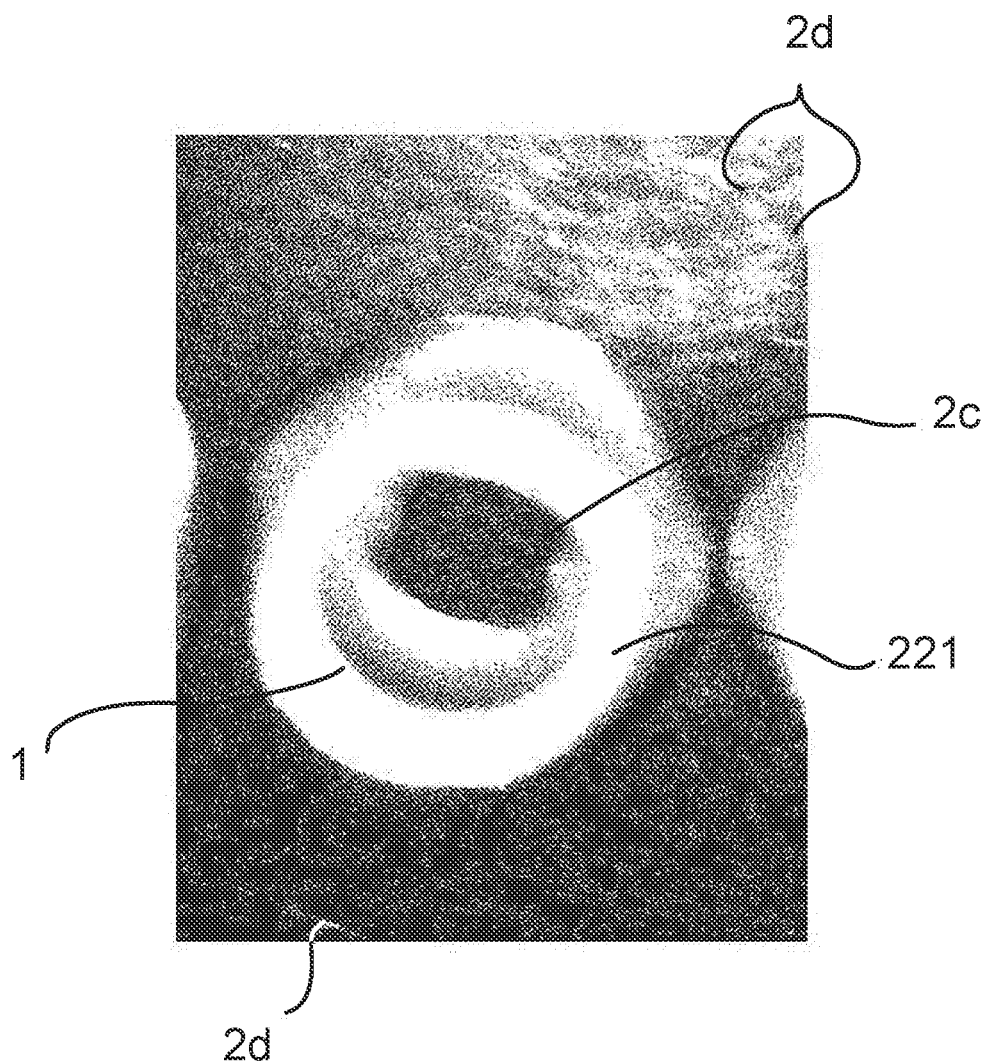
FIG. 10 shows a photograph of a hologram

FIG. 10 shows a photograph of a provided hologram 1 in a thin-film system which has a motif 221 in the form of circular lines detectable by an observer and/or by a sensor. In an inner region 2c and an outer region 2d, the motif 221 of the provided hologram 1 is not detectable for an observer and/or for a sensor, as there is no height profile of the hologram 1 there. The thin-film system therefore has a defined varnish layer in the inner region 2c and the outer region 2d, with the result that an observer and/or a sensor detects the color effect of the thin-film system in the inner region 2c and the outer region. In the region of the motif 221 of the provided hologram 1 on the other hand, the color effect of the thin-film system is attenuated or even suppressed, whereby the motif 221 appears much weaker in color or even colorlessly gray or achromatically white. The motif 221 is arranged in particular in perfect register with the inner region 2c and the outer region 2d. The inner region 2c and/or the outer region 2d have a color change effect provided by interference effects of the thin-film system for an observer and/or a sensor when tilted and/or when the viewing direction is changed with respect to the thin-film system. Here, the region of the motif 221 in the form of circular lines has in particular no color change effects provided by interference effects of the thin-film system when tilted and/or when the viewing angle is changed. For example, a green interference color can be detectable for an observer and/or a sensor in the inner region 2c and the outer region 2d and not in the region of the motif 221 in the form of circular lines. When tilted the green interference color changes for example to blue.

It is possible for the assigned height profiles and/or the height profiles 60a, 60b of the provided hologram 1 to be incorporated into or applied to an opaque substrate 2, in particular paper documents or opaque paper banknotes.

The assigned height profiles and/or the height profiles 60a, 60b of the provided hologram 1 are preferably incorporated into or applied to at least one window region, in particular at least one window region of an ID1 card, or a transparent substrate, in particular a transparent polymer banknote. The height profiles 60a, 60b of the provided hologram 1 hereby become detectable at least from the front and back side and/or when viewed in transmitted light.

The hologram 1 is further incorporated into the substrate 2 by exposure of a volume hologram material, wherein the object wave starts from the height profile assigned to the hologram. Here, the assigned height profiles and/or the height profiles 60a, 60b of the hologram 1 are transformed in particular into the progression of the Bragg planes of the volume hologram generated hereby.

Figure 10A:
FIG. 10a shows a photograph of a design
Figure 10B:
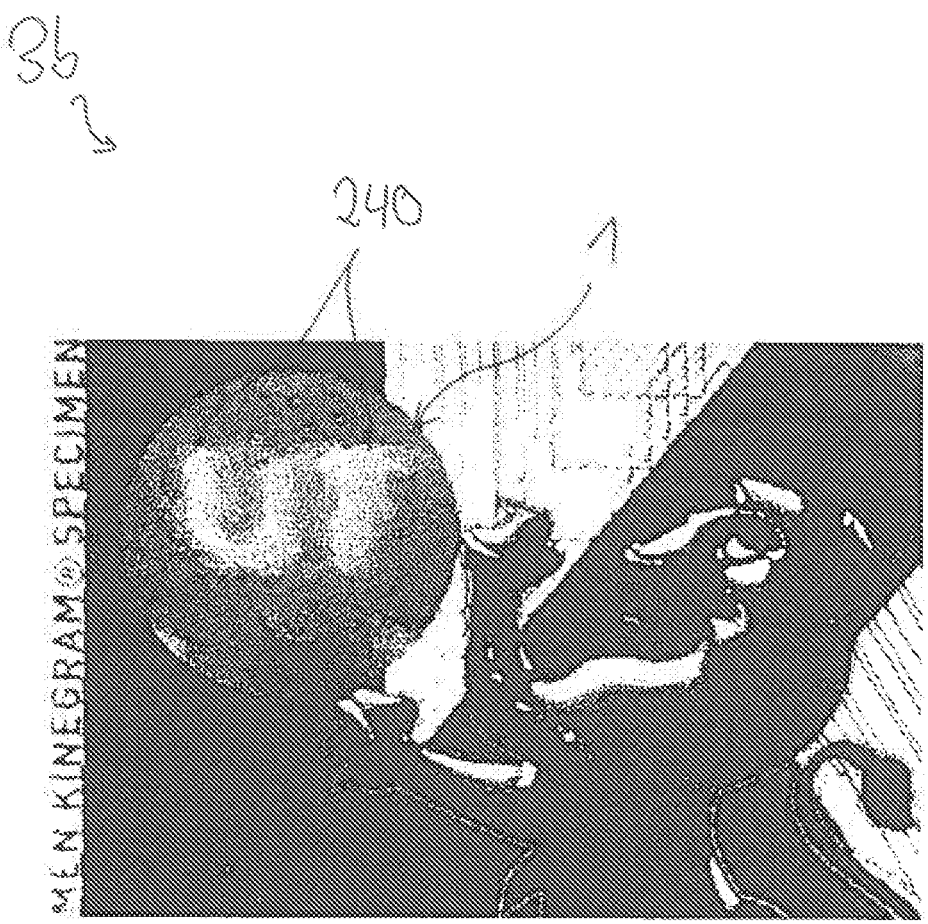
FIG. 10b shows a photograph of a design
FIG. 11 schematically shows a hologram
FIG. 12 schematically shows a hologram
FIG. 13 schematically shows a hologram
FIG. 14 schematically shows a security document
FIG. 15 schematically shows a security document
FIG. 16 schematically shows a security document
FIG. 17 schematically shows a security document
FIG. 18 schematically shows a security element
FIG. 19 schematically shows a bent security element
FIG. 20 schematically shows an arrangement of hologram planes

FIGS. 10a and 10b in each case show a photograph of a design 3b, in particular the same design, which comprises a provided hologram 1. The hologram 1 is contained in the circular region of the design 3b with an area percentage of 100%. The provided hologram 1 has a motif 240 detectable by an observer and/or by a sensor in the form of the two letters or the sequence of letters "UT". The hologram is provided such that, as shown in particular in FIG. 10a, the motif 240 is not detectable when illuminated with non-collimated light, for example under diffuse illumination. If, on the other hand, the provided hologram is illuminated with a collimated light source, for example an LED light of a smartphone, the provided motif "UT" appears, as shown in FIG. 10b.

In particular, it is possible for the virtual total electromagnetic fields in the one or more first zones to be calculated in each case on the basis of the virtual electromagnetic fields of the one or more first virtual models and/or for the virtual total electromagnetic fields in the one or more second zones to be calculated in each case on the basis of the virtual electromagnetic fields of the one or more second virtual models such that one or more first motifs assigned to the one or more first virtual models and/or that one or more second motifs assigned to the one or more second virtual models, in particular according to the curvature progression of the one or more zones, first zones and/or second zones, are not detectable for an observer and/or for a sensor, in particular when illuminated with non-collimated light, preferably under diffuse illumination, and/or are detectable for an observer and/or for a sensor, in particular when illuminated with collimated light, preferably when illuminated with an LED light, in particular preferably when illuminated with an LED light of a smartphone.

It is further possible for the virtual total electromagnetic fields in the one or more first zones to be calculated in each case on the basis of the virtual electromagnetic fields of the one or more first virtual models and/or for the virtual total electromagnetic fields in the one or more second zones to be calculated in each case on the basis of the virtual electromagnetic fields of the one or more second virtual models such that a first portion of the one or more first motifs assigned to the one or more first virtual models and/or that a second portion of the one or more second motifs assigned to the one or more second virtual models is detectable for an observer and/or for a sensor when the substrate is bent or curved, in particular according to the curvature progression of the one or more zones, first zones and/or second zones, and/or is not, in particular partially, detectable for an observer and/or for a sensor in the flat or unbent or non-curved state of the substrate, in particular according to the curvature progression of the one or more zones, first zones and/or second zones, wherein the one or more first motifs preferably generate a first total motif comprising the first portion of the one or more first motifs and/or the one or more second motifs preferably generate a second total motif comprising the second portion of the one or more second motifs.

Figure 11:
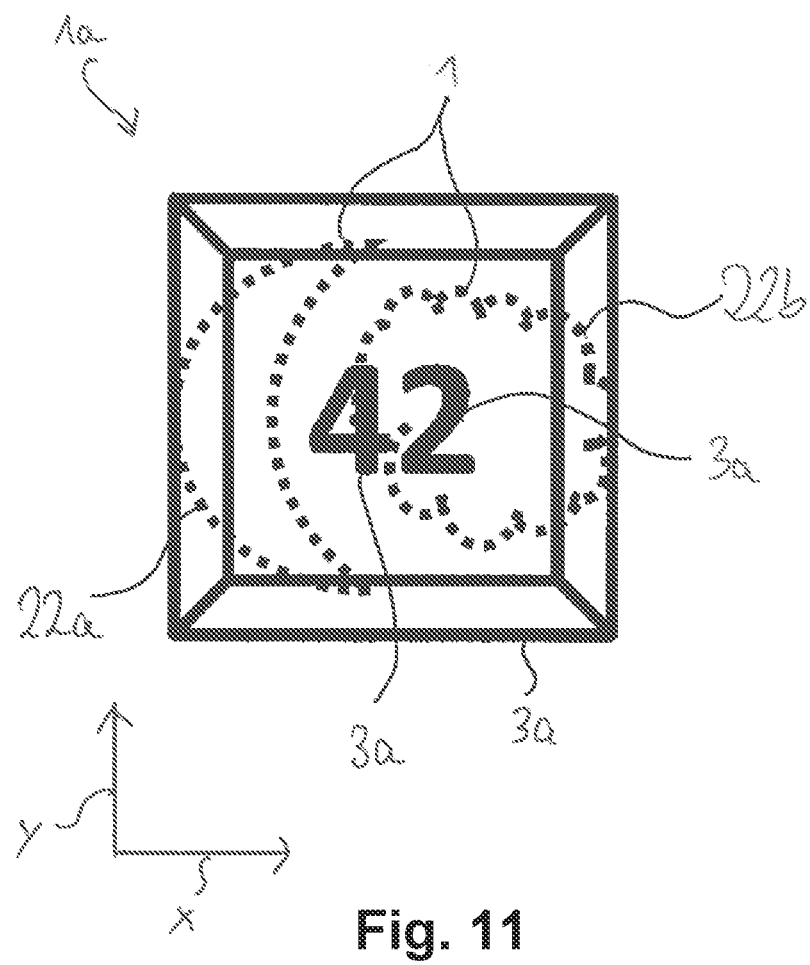

FIG. 11 shows a security element 1a when viewed perpendicularly, in relation to the drawing plane or the plane spanned by the axes x and y. The security element 1a comprises three design elements 3a, wherein one of the design elements 3a comprises the number "42" and a square shape with a double frame and in each case diagonally running lines in the corners of the square shape, which each connect identically aligned corners of the two frames.

A first motif 22a in the form of a crescent moon in a first region 2a and a second motif 22b in the form of a cloud in a second region 2b of a provided hologram 1 are not detectable for an observer and/or for a sensor when the security element 1a is viewed perpendicularly. The first motif 22a and the second motif 22b are, indicated by the dashed lines, concealed by the three design elements 3a.

Figure 12:
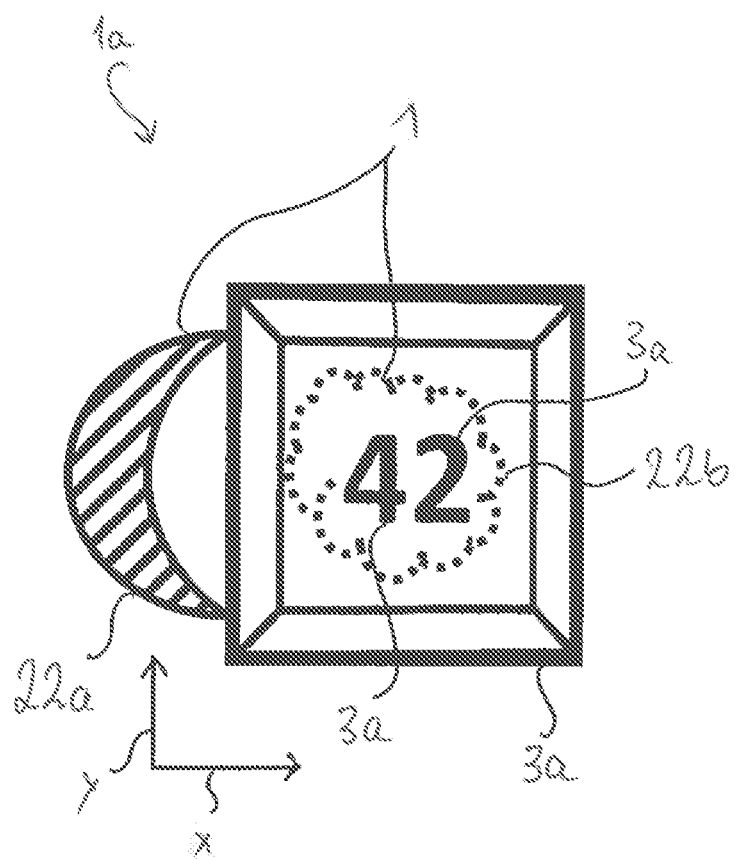

FIG. 12 shows the security element 1a when tilted to the right along the axis y. The first motif 22a and the second motif 22b are no longer located in the first or second region 2a, 2b. The first motif 22a is located on the left alongside the three design elements 3a and the second motif 22b is located underneath the three design elements 3a. The first motif 22a is detectable for an observer and/or for a sensor and the second motif 22b is concealed by the three design elements 3b, indicated by the dashed lines, and is thus not detectable for an observer and/or a sensor.

Figure 13:
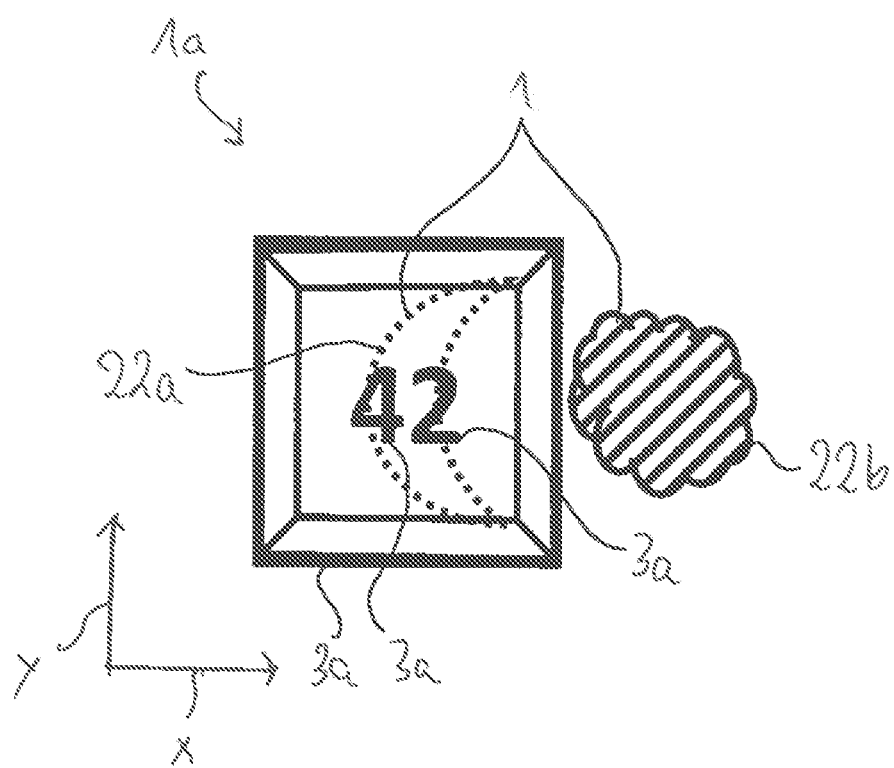

FIG. 13 shows the security element 1a when tilted to the left along the axis y. The first motif 22a and the second motif 22b are no longer located in the first or second region 2a, 2b. The first motif 22a is located underneath the three design elements 3a and the second motif 22b is located on the right alongside the three design elements 3a. The second motif 22b is detectable for an observer and/or for a sensor and the first motif 22a is concealed by the three design elements 3a, indicated by the dashed line, and is thus not detectable for an observer and/or a sensor.

It is possible for one or more of the three design elements 3a likewise to be motifs of the provided hologram 1. In particular, the motifs of the three design elements 3a here are calculated during the calculation of the hologram 1 such that the perspective or the perspective optical impression of the motifs of the three design elements for an observer and/or a sensor does not change with any desired viewing angle.

It is further possible for the assigned height profiles and/or one or more of the height profiles 60, 60a, 60b of the hologram 1 to be incorporated into the first region 2a of the substrate 2 and for the height profile of one or more of the further optically variable structures 63 to be incorporated into the second region 2b of the substrate 2.

In particular, the second region 2b and the first region 2a overlap at least partially, wherein the first region 2a and/or the second region 2b preferably consists of one coherent region or of a plurality of non-coherent regions.

The first region 2a preferably does not overlap the second region 2b. The first region 2a and the second region 2b are preferably arranged neighboring each other or further preferably arranged nested in each other. For example, the first region 2a surrounds the second region 2b or the second region 2b surrounds the first region 2a.

Figure 14:
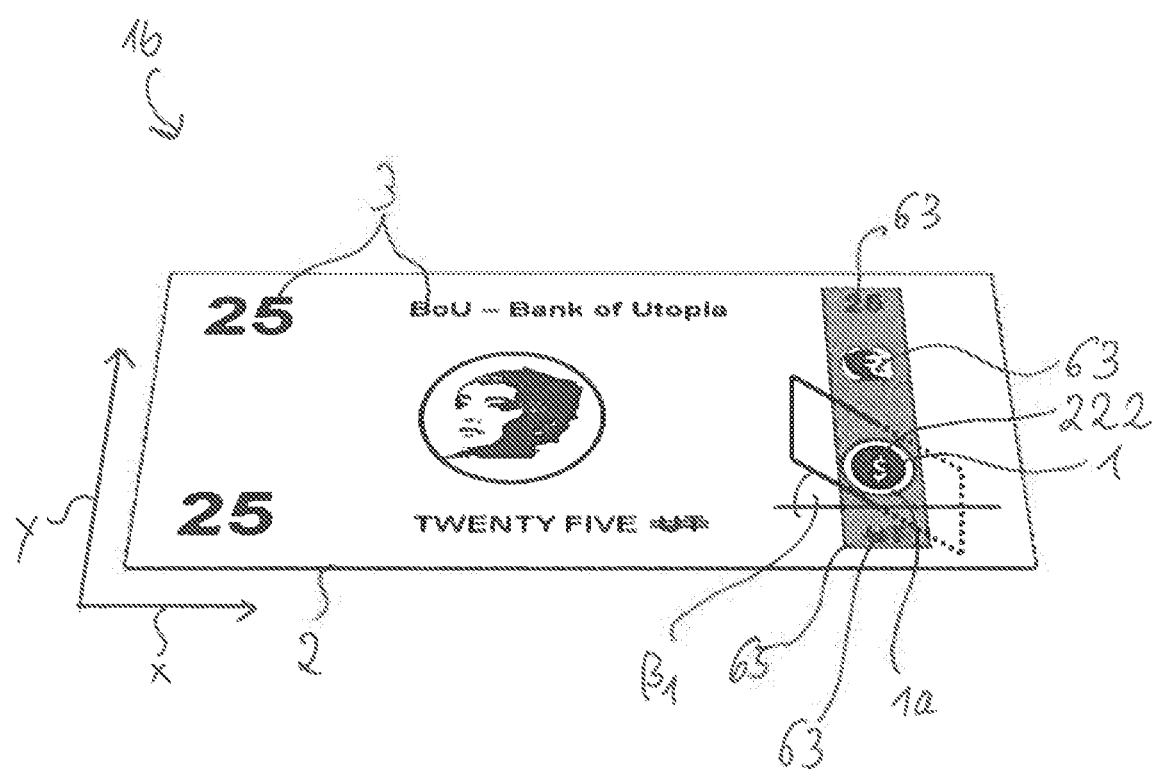
Figure 15:
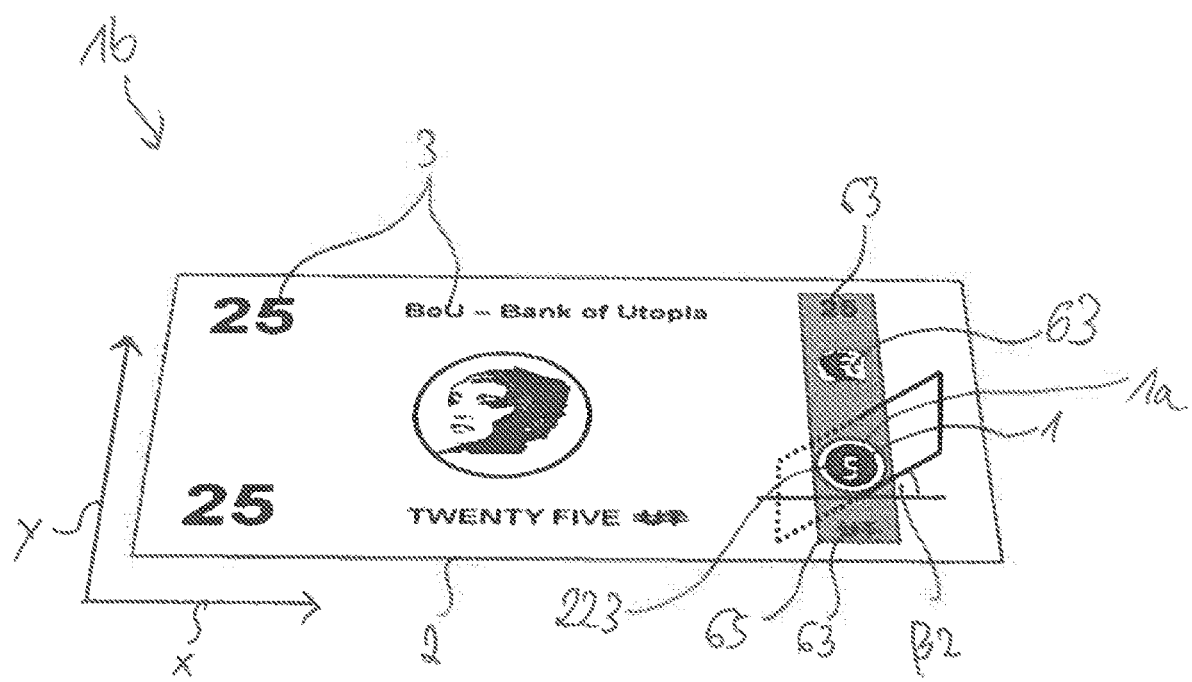

FIGS. 14 and 15 show the security document 1b shown in FIG. 7 in a perspective representation, wherein the security document 1b comprises a security element 1a which has a provided hologram 1.

FIG. 14 shows a first motif 222 of the provided hologram 1 when the security document 1b is tilted by the angle $\beta_1$ with respect to the axis y.

FIG. 15 shows a second motif 223 of the provided hologram 1 when the security document 1b is tilted by the angle $\beta_2$ with respect to the axis y.

The provided hologram 1 is preferably calculated such that different motifs of the provided hologram 1 are detectable for an observer and/or sensor depending on the viewing angle and/or tilt angle of the security document 1b. Here, the provided hologram displays a change or flip between at least two motifs or a sequence of motifs or between the first and the second motif 222, 223 when the security document 1b is tilted to the left or to the right, or about the axis y.

When the security document 1b is tilted to the right, in FIG. 14, for example, the first motif 222 in the form of a dollar sign is detectable for an observer and/or sensor, while, in FIG. 15, for example, the motif 223 which is formed as the number "5" becomes detectable for an observer and/or sensor when the security document 1b is tilted. The first and/or the second motif 222, 223 are preferably arranged in the same position or in different positions—i.e. spaced apart from each other—on the security document 1b.

An observer and/or a sensor preferably detects the first and/or the second motif 222, 223 above or underneath the plane spanned by the security element 1b, wherein the first motif 222 and/or the second motif 223 is detectable above the plane spanned by the security element 1b or the second motif 223 and/or the first motif 222 is detectable underneath the plane spanned by the security element 1b.

The three design elements 3a are particularly preferably detectable for an observer and/or sensor in the plane spanned by the security element 1b. These design elements 3a thereby represent an optical reference for the observer and/or sensor.

It is possible for the first motif 222 and/or the second motif 223 to be detectable for an observer and/or a sensor when the security document 1b is tilted about the axis x. Here, the provided hologram displays a change or flip between at least two motifs or a sequence of motifs or the first and the second motif 222, 223 when the security document 1b is tilted upwards or downwards, or about the axis x.

In particular, the first motif 222 and/or the second motif 223 can be detectable for an observer and/or sensor above or underneath the plane spanned by the security document 1b.

It is further possible for the first motif 222 and/or the second motif 223 to be detectable for an observer and/or a sensor when the security document 1b is rotated about the surface normal of the plane spanned by the security document 1b. Here, the provided hologram displays a change or flip between at least two motifs or a sequence of motifs or the first and the second motif 222, 223 when the security document 1b is rotated in the plane of the security document 1b, wherein the first motif 222 and/or the second motif 223 are detectable for an observer and/or sensor underneath or above the plane spanned by the security element 1b.

Two or more of the zones 11 are preferably assigned in each case to one of the virtual hologram planes 10 and the virtual total electromagnetic fields 41 in the one or more zones 11 are calculated in each case on the basis of the virtual electromagnetic fields 40 of the one or more zones 11. One or more of the virtual models 20 are thus partially or completely detectable by an observer and/or a sensor as a sequence of the one or more motifs 22 assigned to one or more virtual models 20 or of the first motif 222 and the second motif 223 when the substrate 2 or the security document 1b is tilted and/or rotated. In particular, this sequence of the one or more motifs 22 or of the first motif 222 and the second motif 223 provides a parallactic movement effect or an orthoparallactic movement effect. Such a sequence of the one or more virtual models 20 preferably provides a combination of a parallactic movement effect and an orthoparallactic movement effect for an observer or sensor.

Further, one or more of the virtual models 20 are preferably partially or completely detectable by an observer and/or a sensor as a sequence of one or more motifs 22 assigned to the one or more virtual models 20 or of the first motif 222 and the second motif 223 when the substrate 2 or the security document 1b is tilted and/or rotated. Here, one or more of the motifs 22 or the first motif 222 and the second motif 223 in particular have different or identical movements between different and/or identical movement directions. Here, preferably, the distance between one or more of the motifs 22 or of the first motif 222 and the second motif 223, in particular the geometric centroids of one or more of the virtual motifs 22 or of the first motif 222 and the second motif 223, and the plane spanned by the substrate 2 or the security document 1b is preferably between −50 mm and +50 mm, preferably between −25 mm and +25 mm, in particular preference between −15 mm and +15 mm.

In particular, the virtual total electromagnetic fields 41 in the one or more first zones 11a are calculated in each case on the basis of the virtual electromagnetic fields 40 of the one or more first virtual models 20a. The virtual total electromagnetic fields 41 of the one or more second zones 11b are preferably calculated in each case on the basis of the virtual electromagnetic fields 40 of the one or more second virtual models 20b. The first motif 222 assigned to the one or more first virtual models 20a preferably hereby becomes partially or completely detectable for an observer and/or a sensor when the substrate 2 or the security document 1b is aligned according to the alignment of the one or more first zones 11a and the second motif 223 assigned to the one or more second virtual models 20b preferably becomes partially or completely detectable for an observer and/or a sensor when the substrate 2 or security document 1b is aligned according to the alignment of the one more second zones 11a.

One or more motifs 22 assigned to the one or more of the virtual models 20 or the first motif 222 and the second motif 223 are preferably partially or completely detectable by an observer and/or a sensor from different observation directions. In particular, the motifs 22 or the first motif 222 and the second motif 223 are assembled to form a grid of dots or strips, in particular a linear barcode or a 2D barcode, preferably a QR code, when observed from the different observation directions. Here, one or more of the dots or one or more of the strips are preferably arranged in each case at different distances from the plane spanned by the substrate 2 or the security document 1b, in particular arranged above and/or underneath and/or within the plane spanned by the substrate 2 or the security document 1b.

Figure 16:
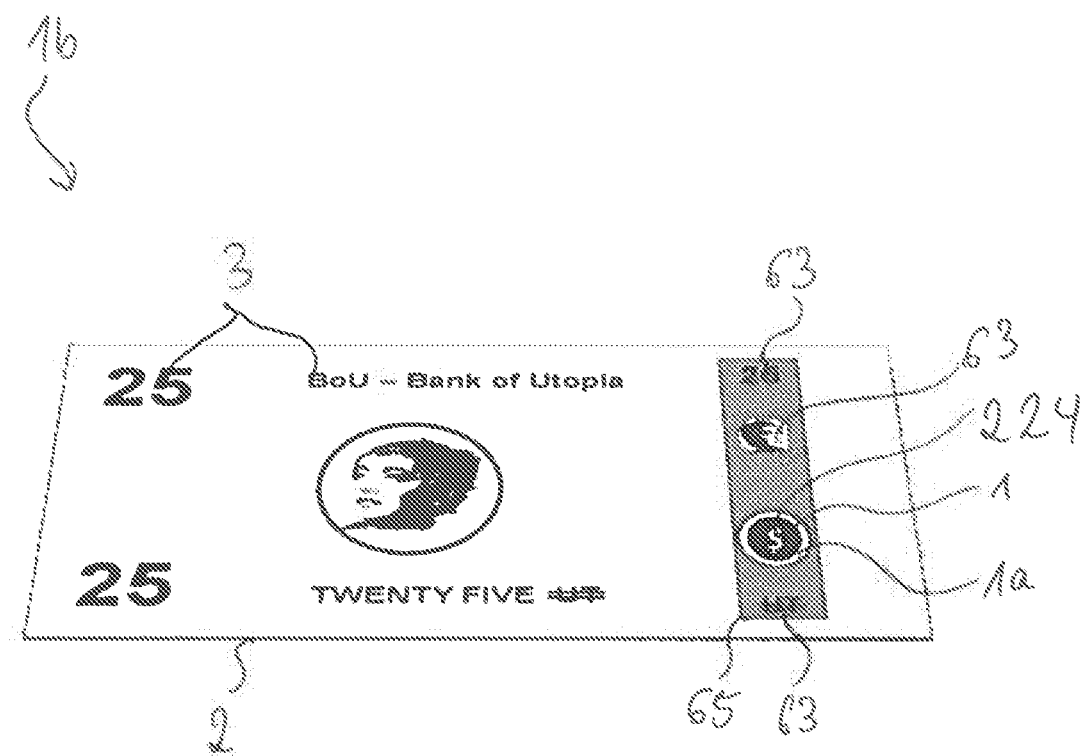
Figure 17:
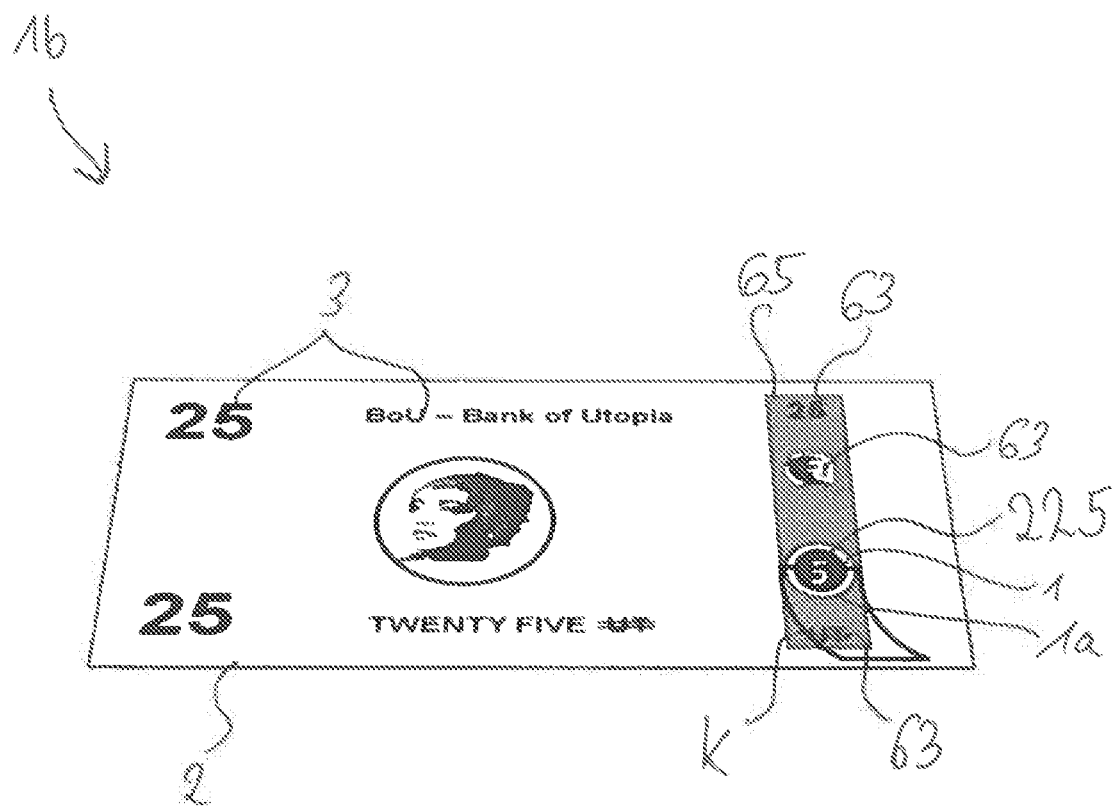

FIGS. 16 and 17 show the security document 1b shown in FIG. 7 in a perspective representation, wherein the security document 1b comprises a security element 1a which has a provided hologram 1.

FIG. 16 shows a first motif 224 of the provided hologram 1 when the security document 1b is aligned flat.

FIG. 17 shows a second motif 225 of the provided hologram 1 when the security document 1b is bent or curved along the two-dimensional curved curve K.

The first motif 224 is formed as a $ sign and the second motif 225 is formed as the number "5".

In particular, the geometry of the two-dimensional curved curve K corresponds to the geometry of the virtual hologram plane 10 used during the calculation of the provided hologram 1, wherein the geometry of one or more of the virtual hologram planes 10 in one or more of the zones 11 corresponds in each case to a lateral surface of a cylindrical segment or a freeform surface.

One or more of the virtual hologram planes 10 in one or more of the zones 11 preferably have a predetermined curvature progression. Here, the virtual hologram planes 10 have in particular curvature progressions that are different in different directions. The virtual total electromagnetic field 41 in the one or more zones 11 is preferably calculated in each case on the basis of the virtual electromagnetic fields 40 of one or more first ones of the one or more virtual models 20a. The provided hologram 1 hereby becomes partially or completely detectable for an observer and/or a sensor when the substrate 2 or the security document 1b is bent or curved according to the curvature progression of the one or more zones 11. In particular, the one or more first motifs 22a assigned to the one or more first virtual models 20a or the first motif 224 and the second motif 225 become partially or completely detectable for the observer or the sensor when the substrate 2 or the security document 1b is bent or curved according to the curvature progression of the one or more zones 11.

In particular, one or more of the curved hologram planes strike the eye of the observer and/or the sensor at an angle dependent on position when a provided hologram 1 designed for a plane is viewed from each point ($x_h$, $y_h$).

Figure 18:
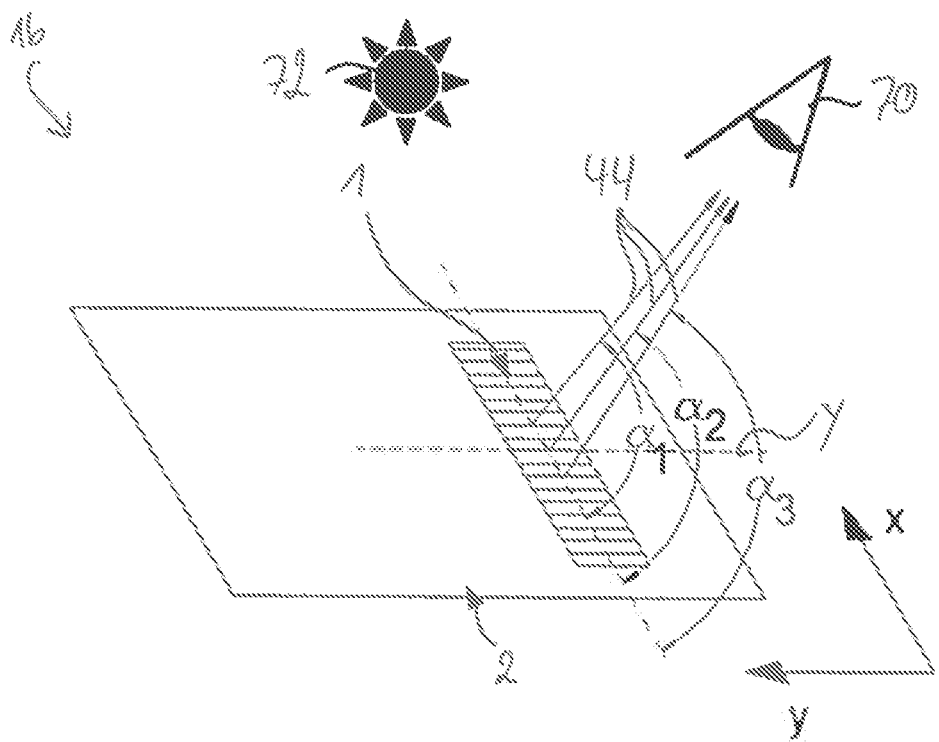

FIG. 18 shows a security document 1b comprising a provided hologram 1 which is illuminated by a light source 72, in particular is illuminated in reflected light. The light starting from the hologram 1 has particular propagation directions 44 characterized by the angles $\alpha_1$, $\alpha_2$, $\alpha_3$ relative to the eye of an observer 70.

Figure 19:
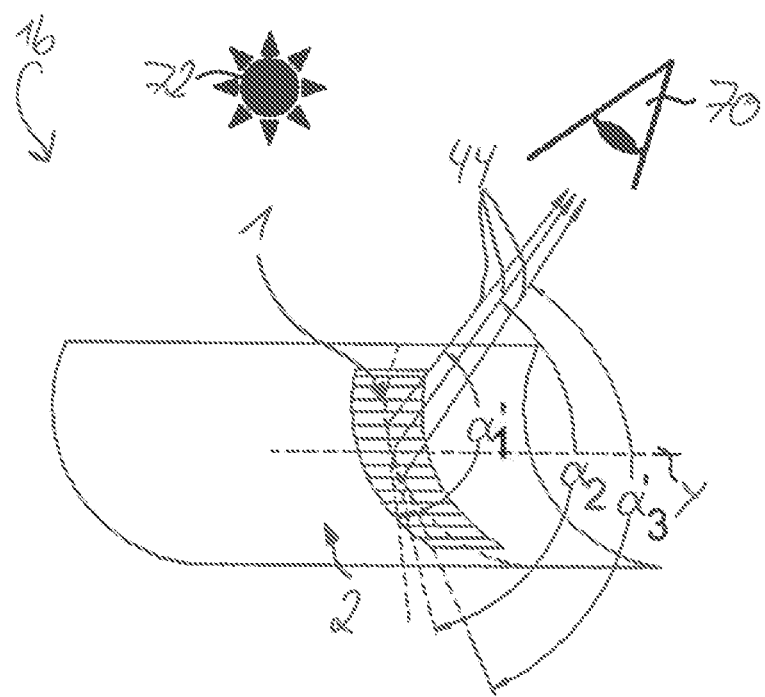

FIG. 19 shows the security document 1b shown in FIG. 18, wherein the security document 1b is bent around the axis y, with the result that the propagation directions 44 of the light are characterized by the angles $\alpha'_1$, $\alpha'_2$ and $\alpha'_3$, which differ from the angles $\alpha_1$, $\alpha_2$, $\alpha_3$.

During the calculation of the provided hologram 1 for a curved surface, such as for example the security document 1b shown in FIG. 19, the virtual hologram plane is simulated by a virtual hologram plane which has a curvature according to the curved surface.

Figure 20:
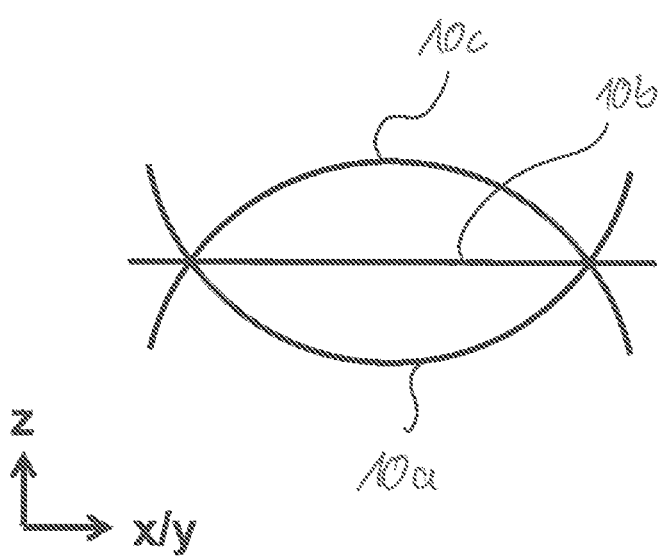

FIG. 20 shows three virtual hologram planes 10a, 10b, 10c, wherein the virtual hologram plane 10a has a concave curvature and the virtual hologram plane 10c has a convex curvature.

In particular, two or more of the virtual hologram planes 10a, 10b, 10c in each case have one or more zones 11.

The virtual hologram planes 10a, 10b, 10c differ in particular in relation to their alignment, positioning, dimensions and/or curvature, wherein the virtual hologram planes 10a, 10b, 10c in the respective zones 11 differ in relation to their alignment, positioning, dimensions and/or curvature.

One or more of the virtual hologram planes 10a, 10b, 10c in one or more of the zones 11 preferably have a curvature different from zero at least along a reference direction x or y. One or more of the virtual hologram planes 10a, 10b, 10c preferably have a local curvature wherein the radius of curvature assigned to the local curvature is in particular between 5 mm and 50 mm, preferably between 10 mm and 30 mm.

The local curvature can in particular be in the form of circular segments or in the form of parabolic segments.

Figure 21:
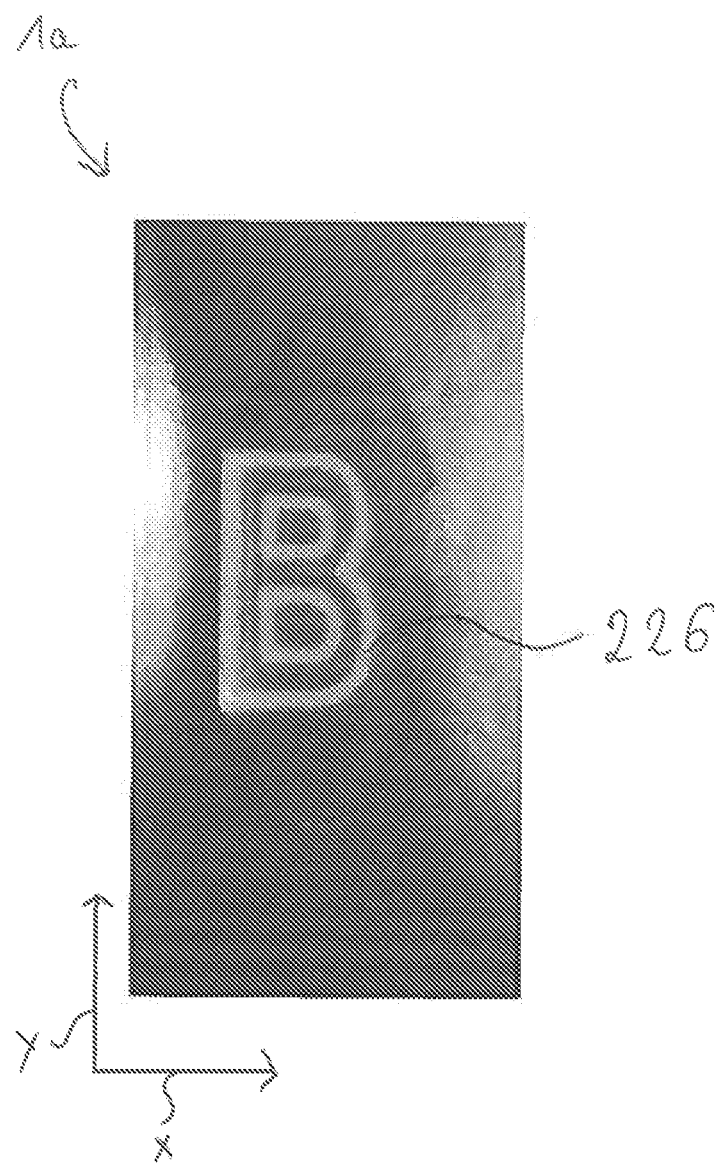
FIG. 21 shows a photograph of a hologram

FIG. 21 shows the photograph of a flat security element 1a comprising a provided hologram 1 which has a motif 226 in the form of the letter "B". The security element 1a extends along the axes x and y.

Figure 22:
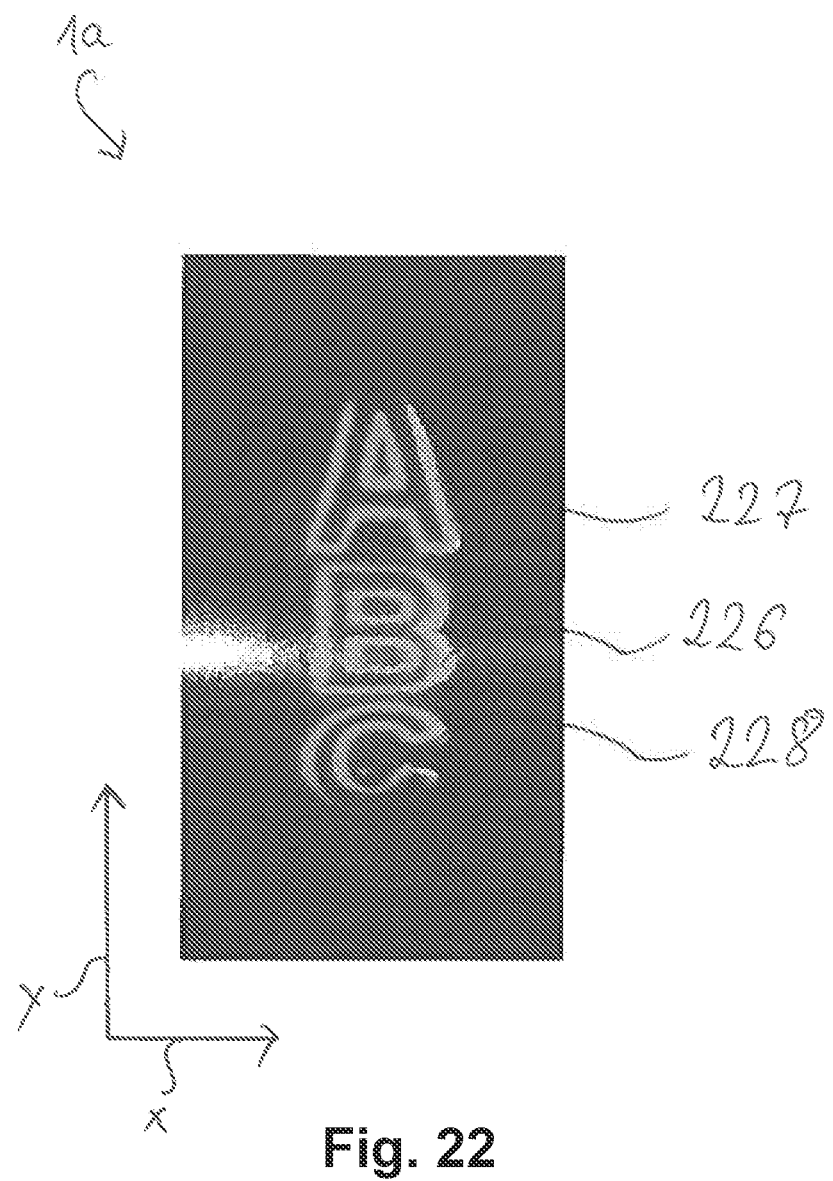
FIG. 22 shows a photograph of a bent hologram

FIG. 22 shows the security element 1a shown in FIG. 21 comprising the provided hologram 1, wherein the security element 1a is bent along the axis y with a radius of curvature of 0.75 inches and besides the motif 226 additionally has the motifs 227 and 228, in each case in the form of the letter "A" or "C" respectively. The motif 226 is compressed a little in FIG. 22 because of the curvature in the y direction. The effect represented is a flip, in which the motif 226 is completed in the curved state of the security element 1a by the motifs 227 and 228 ("image completion").

The distance of the motif 226 from the virtual hologram plane and the angle α in the case of the motif 226 are 10 mm and, respectively, ±10° (direction of view along the direction x) and ±15° (direction of view along the direction y).

The distance of the motifs 227, 228 from the virtual hologram plane and the angle α in the case of the motifs 227, 228 are 10 mm and, respectively, ±8° (direction of view along the direction x) and ±8° (direction of view along the direction y).

The motif 226 compressed along the axis y is detectable between the further motifs 227 and 228 due to the bending of the security element 1a. The motifs 227 and 228 are not detectable by an observer and/or a sensor when the security document 1a is viewed perpendicularly in the flat state of the security document 1a.

During the calculation of the provided hologram 1 two or more virtual models 20 are preferably provided. Here, in particular, each of the two or more virtual models 20 is assigned to one of the virtual hologram planes 10a, 10b, 10c. The one or more virtual electronic fields 40 starting from the one or more virtual light sources 30 of the assigned virtual model 20 are preferably calculated in the one or more zones 11 of the respective virtual hologram planes 10a, 10b, 10c.

In particular, during the calculation of the provided hologram 1, possible distortions of the motifs occurring later during the detection of the provided hologram 1 by an observer and/or sensor are compensated for in advance, wherein the motifs are correspondingly stretched or compressed.

One or more of the motifs 226, 227, 228 are preferably detectable for an observer and/or for a sensor completely above and/or underneath and/or within the plane spanned by the substrate 2 or the security element 1a when the substrate 2 or the security element 1a is bent or curved according to the curvature progression of the one or more zones 11, which comprise in particular the motifs 226, 227, 228. In particular, the distance between one or more of the motifs 226, 227, 228 and the plane spanned by the substrate 2 or the security element 1a is between −50 mm and +50 mm, preferably between −25 mm and +25 mm, in particular preferably between −15 mm and +15 mm.

Two or more of the virtual hologram planes 10a, 10b, 10c in one or more first ones of the zones 11a further preferably have a different curvature progression and/or a different alignment from the curvature progression and/or the alignment in one or more second ones of the zones 11b. In particular, the virtual total electromagnetic fields 41 in the one or more first and second zones 11a, 11 b are calculated in each case on the basis of the virtual electronic fields 40 of one or more first or second ones of the one or more virtual models 20a, 20b. This is such that the provided hologram 1 is partially or completely detectable for an observer and/or for a sensor when the substrate 2 or the security element 1a is bent or curved according to the curvature progression of the one or more first or second zones 11a, 11 b or when aligned according to the alignment of the first or second zones 11a, 11b.

The virtual total electromagnetic fields 41 in the one or more first zones 11a are preferably calculated in each case on the basis of the virtual electromagnetic fields 40 of the one or more first virtual models 20a. The virtual total electromagnetic fields 41 in the one or more second zones 11b are preferably calculated in each case on the basis of the virtual electromagnetic fields 40 of the one or more second virtual models 20b. Here, the motif 226 assigned to the first virtual model 20b becomes partially or completely detectable for an observer and/or a sensor when the substrate 2 or the security element 1a is bent or curved according to the curvature progression of the one or more first zones 11a. In particular, the motifs 227 and 228 assigned to the two second virtual models 20b become partially or completely detectable for an observer and/or a sensor when the substrate 2 or the security element 1a is bent or curved according to the curvature progression of the one or more second zones 11.

One or more of the motifs 226, 227, 228 are preferably detectable by an optical sensor and/or a human observer of the provided hologram 1, wherein the motif 226 is assigned to the first virtual model 20a and the motifs 227, 228 are assigned in the second virtual model 20b.

One motif from a first quantity of motifs 226 is further preferably detectable for an observer and/or a sensor when the substrate 2 or the security element 1a is arranged flat or not curved and/or one or two motifs from a second quantity of motifs 227, 228 are partially or completely detectable for an observer and/or sensor when the substrate 2 or the security element 1a is bent or curved according to the curvature progression of the or one of the virtual hologram planes 10a, 10b, 10c in the or one of the zones 11. The motifs from the first quantity of motifs 226 and the motifs from the second quantity of motifs 227, 228 preferably differ partially or completely.

One motif from a third quantity of motifs 226 preferably partially or completely provides a parallactic movement effect detectable by an observer and/or by a sensor when the substrate 2 or the security element 1a is tilted and/or rotated and/or one or two motifs from a fourth quantity of motifs 227, 228 provide an anti-parallactic or orthoparallactic movement effect detectable by an observer and/or by a sensor when the substrate 2 or the security element 1a is tilted and/or rotated. In particular, the motif from the third quantity of motifs 226 and the motifs from the fourth quantity of motifs 227, 228 are partially or completely different.

One motif from a fifth quantity of motifs 226 preferably has the same spatial distances or different spatial distances from one or two motifs from a sixth quantity of motifs 227, 228. The motif from the fifth quantity of motifs 226 and the motifs from the sixth quantity of motifs 227, 228 are preferably partially or completely different.

One motif from a seventh quantity of motifs 226 and/or one or two motifs from an eighth quantity of motifs 227, 228 further preferably overlap each other completely or partially and/or are completely or partially separated from each other spatially. In particular, the motifs from the seventh quantity of motifs 226 and the motifs from the eighth quantity of motifs 227, 228 are partially or completely different.

Figure 23:
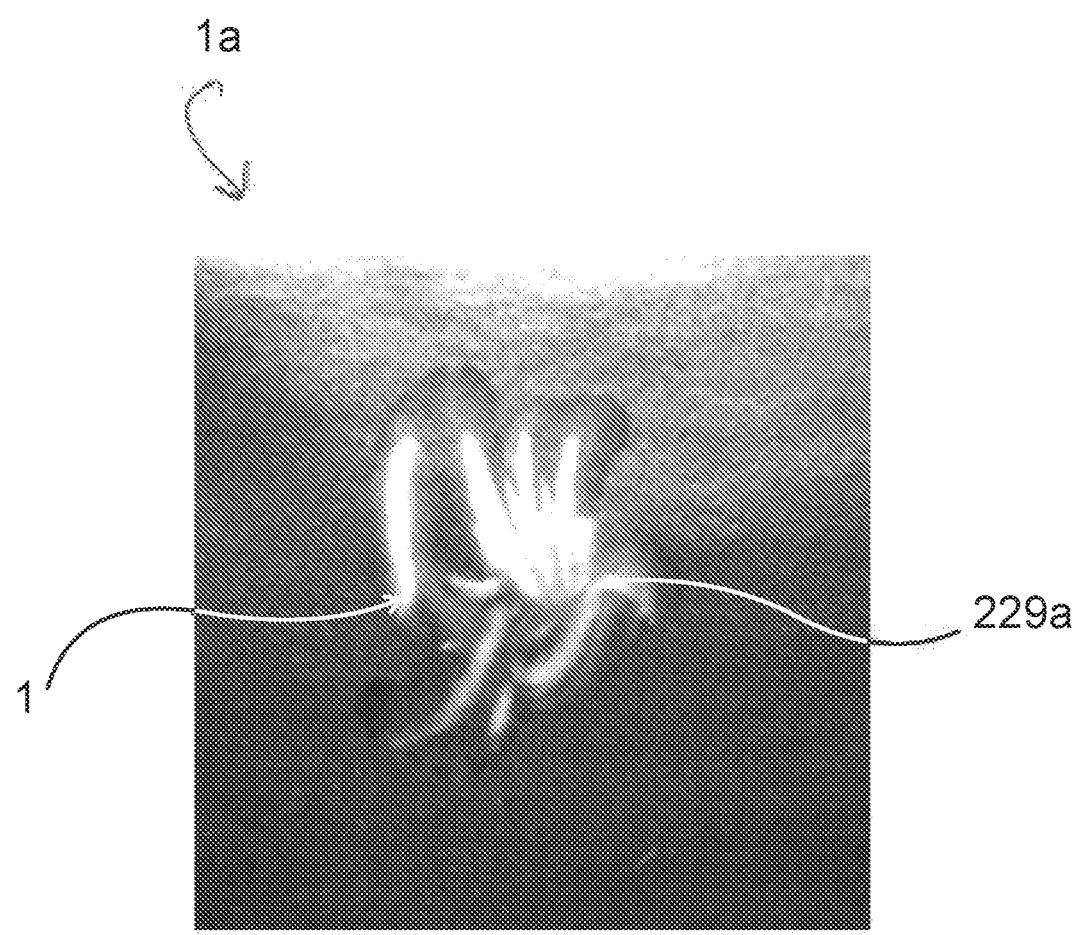
FIG. 23 shows a photograph of a hologram

FIG. 23 shows the photograph of a flat security element 1a which has a provided hologram 1, wherein the provided hologram 1 comprises a motif 229. The motif 229 is formed as a bird in flight and is designed for a bent state. As is to be seen in the photograph, only parts of the bird 229a are recognizable. Thus, the motif 229 does not appear completely for an observer and/or sensor.

Figure 24:
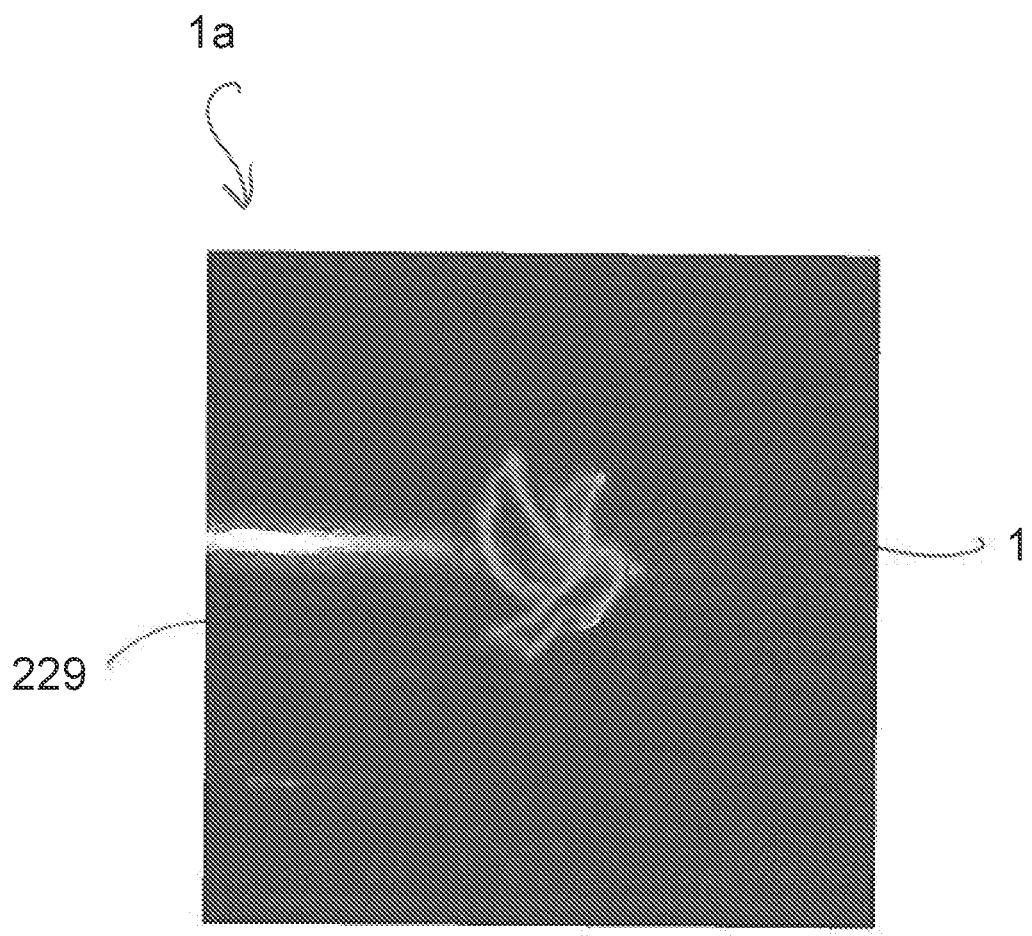
FIG. 24 shows a photograph of a bent hologram
FIG. 25 schematically shows a method step
FIG. 26 schematically shows a method step
FIG. 27 schematically shows a method step
FIG. 28 schematically shows a method step
FIG. 29 schematically shows a method step

FIG. 24 shows the photograph of the security element 1a shown in FIG. 23 in a bent state. The motif 229 is now completely recognizable.

The provided hologram 1 is calculated through a suitable choice of the distance of the motif 229 from the virtual hologram plane 10 and the solid angle which is determined by the angle $\alpha$ such that the motif 229 in the flat state of the security element 1a is partially detectable, in particular as a narrow strip, for an observer and/or sensor, and the motif 229 is not completely detectable.

The distance of the motif 229 from the virtual bent hologram plane and the angle $\alpha$ are 10 mm and, respectively, ±8° (direction of view along the direction x) and ±8° (direction of view along the direction y). The radius of curvature of the hologram plane is 0.75 inches.

Studies have shown that the smaller the angle $\alpha$ and the greater the distance of the motif 229 from the virtual hologram plane 10 are chosen to be, the smaller the region of the motif 229 is, which is already detectable in the flat state of the security element 1a. An effect is hereby achieved in which, for an observer and/or sensor, the motif 229 appears to separate from the plane spanned by the security element 1a during the bending process and the complete motif 229 appears to float above or underneath the bent plane spanned by the security element 1a in the bent state of the security element 1a.

The angle $\alpha$ preferably defines the solid angle at which an observer and/or a sensor detects the provided hologram 1. The provided hologram 1 is calculated in particular such that an observer and/or a sensor first detects it at a particular angle and/or in one or more ranges of angles. The angle $\alpha$ preferably lies in a range of from 30°±25° to 65°±25°, further preferably 20°±15° to 75°±15°, in particular preferably 10°±5° to 85°±5°, wherein the angle α preferably relates to the angle between the maximum solid angle and the plane spanned by the virtual hologram plane and/or by the security element 1a and/or by the security document 1b.

Figure 25:
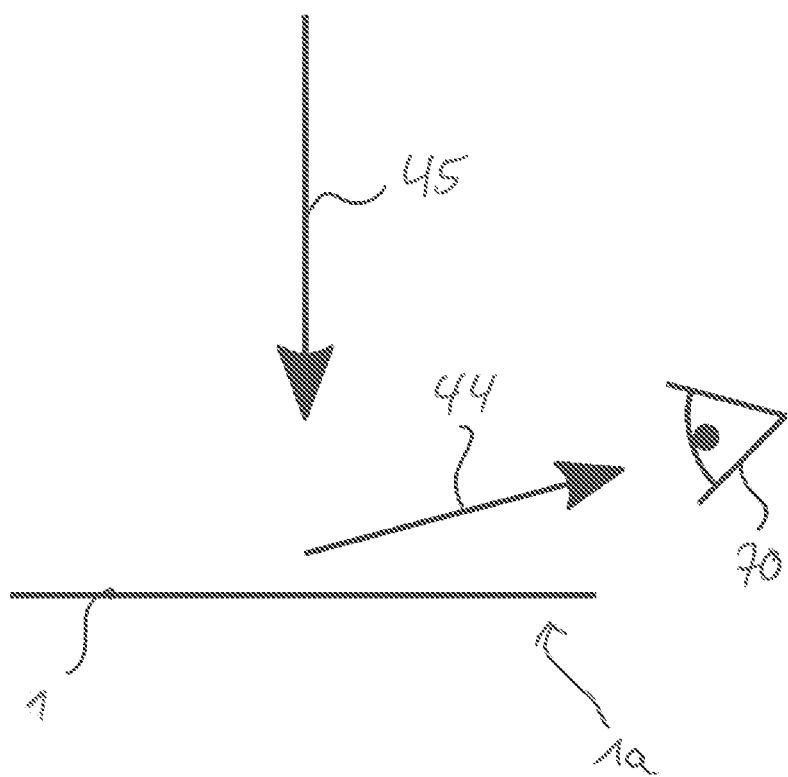

FIG. 25 shows a security element 1a in cross section, which has a provided hologram 1. The perpendicularly incident light along the direction 45 is reflected at the provided hologram 1 such that it propagates along the direction 44 towards the eye of an observer 70.

Figure 26:
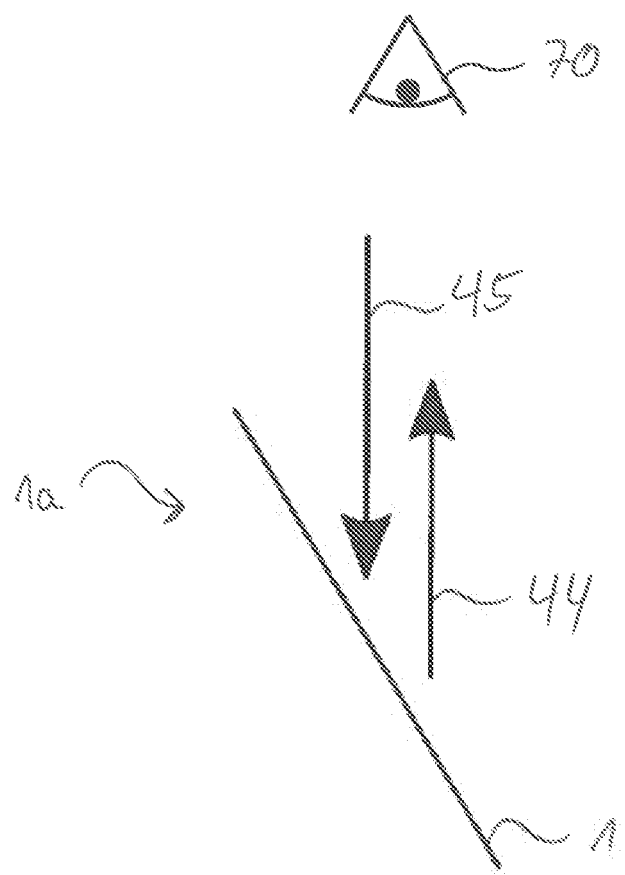

FIG. 26 shows a security element 1a in cross section, which has a provided hologram 1. Here, the incident light along the direction 45 is reflected by the provided hologram 1 in the opposite direction 44 into the eye of an observer 70.

One or more of the motifs are preferably completely or partially detectable by an observer 70 and/or by a sensor in one or more ranges of solid angles, in particular the entire range of solid angles. The one or more ranges of solid angles are in particular arranged symmetrically or asymmetrically around the surface normal, in particular around the average surface normal, of the virtual hologram plane 10. One or more of the ranges of solid angles span in particular a range of angles of from 0° to 30°, preferably a range of angles of from 0° to 20°, in particular preferably a range of angles of from 0° to 15°, relative to the respective surface normals of the assigned virtual hologram planes 10, in particular relative to the average surface normal.

It is possible for provided hologram 1 with a surface relief, e.g. a Fresnel freeform surface, to form grids. Here, the same motif detectable by an observer and/or sensor is preferably provided in the same dimensions in the hologram and in the surface relief. For example, the motif can be a view of a mountain, such as for example the Matterhorn. The combination provided by the gridding of the two effects is provided in particular a more complex optical appearance for an observer and/or sensor than if the respective optical appearance were provided only by the hologram or the surface relief. Such a combination substantially increases the effort of forging a security element or a security document.

It is further possible to complete the provided hologram 1 with surface reliefs, with the result that a motif produced in such a way has optically static and dynamic regions. For example, the body of a lion could be formed as the first part of a motif as surface relief, e.g. as a Fresnel freeform surface, and the head of the lion could be formed as the second part of a motif as provided hologram, wherein when the security element which has the lion motif is tilted the first part of the motif is optically static or almost static and the second part of the motif provides a movement effect.

Figure 27:
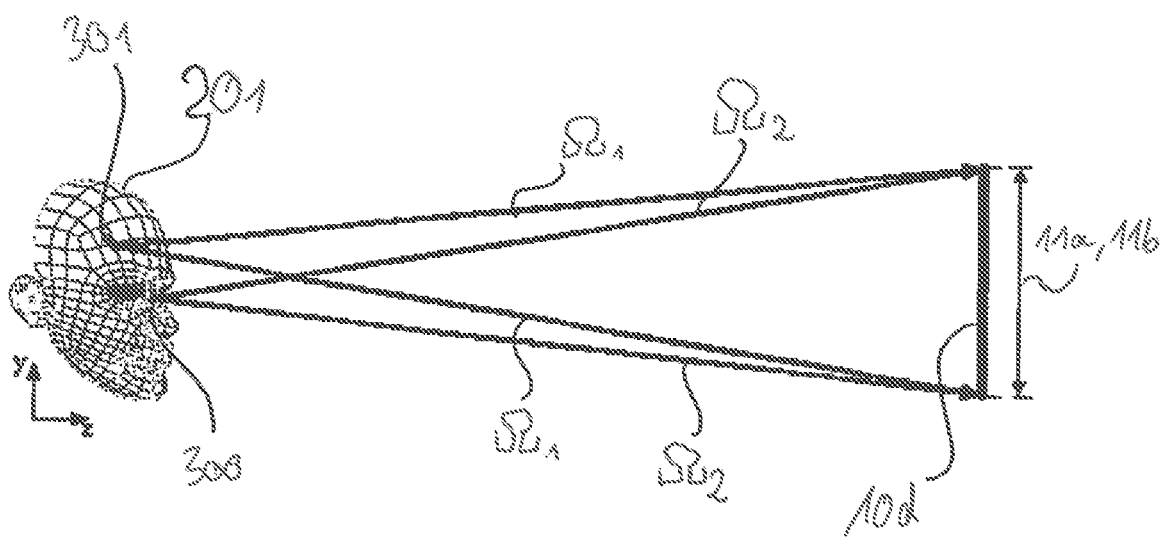

FIG. 27 shows a method step during the calculation of the provided hologram 1, wherein the virtual model 201 has virtual light sources 300, 301, in particular point light sources, on its surface, which emit virtual electromagnetic fields into identical zones 11a, 11b on a virtual hologram plane 10d at the solid angles $\Omega_1$ and $\Omega_2$ respectively.

Figure 28:
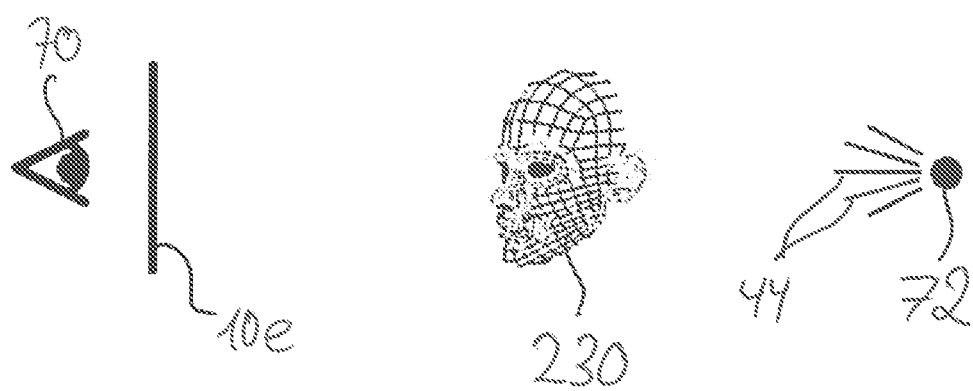

FIG. 28 shows the observation of a motif 230 of a provided hologram 1 by an observer 70 in transmitted light, wherein the hologram plane 10e or the plane spanned by the substrate 2 is arranged between the observer 70 and the motif 230. The light source 72 emits light along the propagation directions 44 towards the hologram plane 10e or the plane spanned by the substrate 2 into the eye of the observer 70. Here, the distance between the eye of the observer 70 and the hologram plane 10e or the plane spanned by the substrate 2 is preferably between 25 cm and 30 cm.

For the observer 70, the motif 230 is preferably then completely detectable if the substrate is positioned at a distance of between 25 cm and 30 cm in front of the eye of the observer 70 in transmitted light. This optical effect is akin to a "keyhole effect", in which a room which is observed through a keyhole likewise only becomes completely detectable when the eye of an observer is positioned as close as possible to the keyhole.

Studies have shown that the provided hologram 1 appears achromatic, in particular white, when detected by an observer and/or sensor if the difference between the incidence of the light and the viewing angle from which the observer or the sensor detects the provided hologram 1 is small. If the provided hologram 1 is for example viewed perpendicularly or from a parallel direction with respect to the surface normal which is spanned by the substrate 2 and if the illumination angle is more than 30° relative to the plane spanned by the substrate 2, then chromatic aberrations occur. Here, the edge regions of the motif or motifs assigned to the provided hologram 1 appear in particular colored and the central regions preferably appear white, but blurred.

Further studies have shown that the assigned motifs appear monochromatic or rainbow-colored depending on the size when detected by an observer and/or sensor, if the viewing angle with respect to the plane spanned by the substrate 2 lies between 38° and 42°. In particular, the colors of the motifs for the observer or sensor are dependent on the size of the viewing angle.

For example, the one or more motifs 22 assigned to one or more of the virtual models 20 appear white when the plane spanned by the substrate 2 is viewed perpendicularly. In particular, the motifs 22 are detectable in the color blue at a viewing angle of from 30° to 34° with respect to the angle of incidence of the light with a wavelength of from 440 nm to 460 nm, in the color green at the viewing angle of from 38° to 42° with respect to the angle of incidence of the light with a wavelength of from 530 nm to 550 nm and/or in the color red at a viewing angle of from nine 50° to 53° with respect to the angle of incidence of the light with a wavelength of from 640 nm to 660 nm.

Further preferably, the color and/or the colors of the one or more motifs 22 assigned to one or more virtual models 20 changes and/or change when the substrate 2 is tilted and/or rotated.

The motifs 22 of a hologram 1 provided in such a way have a high image sharpness when illuminated with a point light source and detected by an observer and/or sensor, as no chromatic imaging errors occur.

For example, as motif the letter "A" can be detectable when such a provided hologram 1 is tilted horizontally to the left, the letter "B" can be detectable when it is tilted over, and the letter "C" can be detectable when it is tilted to the right. As a further example, a hologram 1 provided in such a way can be combined with a further provided hologram 1, with the result that the motifs 22 assigned to the hologram 1 provided in such a way are detected colored at a viewing angle of 40° with respect to the plane spanned by the substrate 2 and the motifs assigned to the further provided hologram 1 are detectable in white in the range of angles of the directly reflected light.

Figure 29:
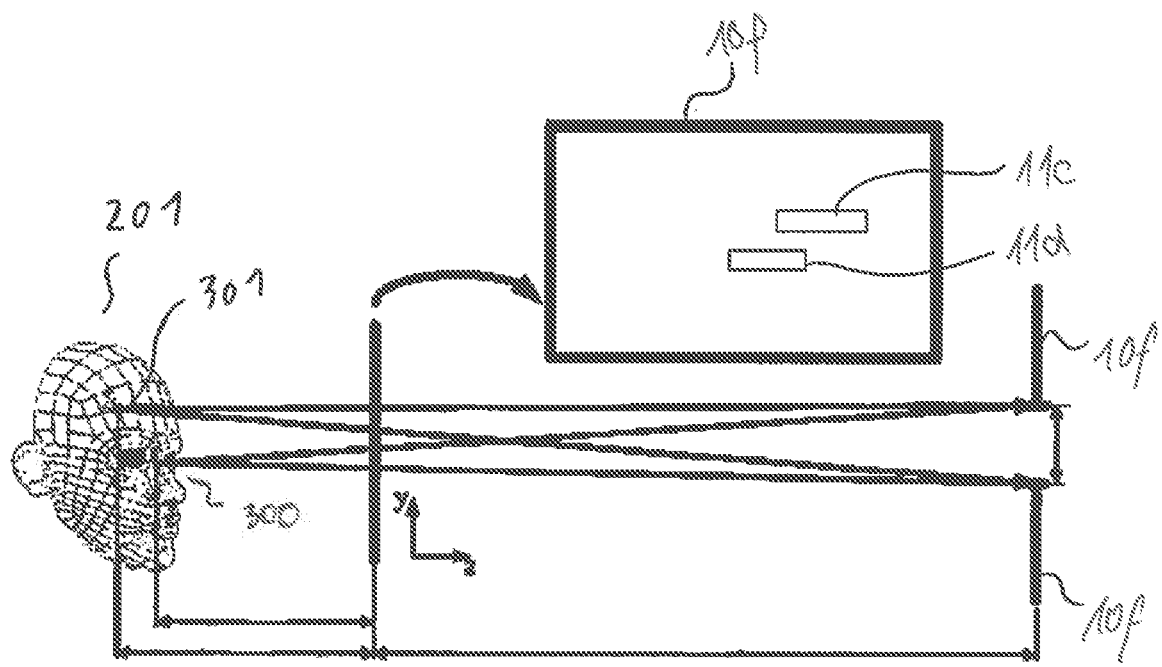

FIG. 29 shows a method step during the calculation of the provided hologram 1, wherein the virtual model has virtual light sources 300, 301, which emits light onto a virtual hologram plane 10f. FIG. 29 further shows the use of an aperture with an elongate keyhole, through which the projected light of all zones must pass. It thus restricts the parallax in the vertical direction (typical for rainbow holograms), but not in the other direction.

The one or more motifs 22 assigned to the provided hologram 1 are preferably detectable for an observer and/or sensor in true colors. Here, in particular the motifs 22 assigned to the one or more virtual models 20 are assembled to form a true-color image from at least one red motif of a third virtual model, at least one green motif of a fourth virtual model and at least one blue motif of a fifth virtual model, wherein the simulated viewing angles and/or solid angles at which the provided hologram 1 is detectable are in particular identical. A provided hologram 1 calculated in such a way is preferably also called a true-color hologram.

The intensities of the at least one red, of the at least one green and/or of the at least one blue motif of the correspondingly assigned first, second and third virtual models are preferably weighted in each case according to the progression of the spectrum of the incident light and/or the progression of the response function of the human eye.

It is possible for slight to strong color distortions or color changes detectable by an observer and/or sensor to occur when the true-color hologram is tilted and/or rotated about a particular axis. Here, in particular, the assigned motifs appear in false colors. Studies have shown that if the angle of incidence of the light is provided to be greater with respect to the plane spanned by the substrate 2, the color stability is better.

Banknotes and/or identity documents which have a security element 1a, comprising a provided hologram 1 and/or a true-color hologram, are preferably detected by an observer and/or sensor at an illumination angle of from 30° to 45° relative to the plane spanned by the substrate 2. In particular, illumination angles of over 70° are very unnatural here.

LIST OF REFERENCE NUMBERS

1 hologram
1a security element
1b security document
2 substrate
2a first region
2b second region
2c back region
2d outer region
3 design elements
3a design elements
3b design
10 virtual hologram plane
10a virtual hologram plane
10b virtual hologram plane
10c virtual hologram plane
10d virtual hologram plane
10e virtual hologram plane
10f virtual hologram plane
11 zone
11a first zone
11b second zone
20 virtual model
200 virtual model
201 virtual model
20a first virtual model
20b second virtual model
20c third virtual model
20d fourth virtual model
20e fifth virtual model
21 partial region of the surface
22 motif
220 motif
221 motif
222 motif
223 motif
224 motif
225 motif
226 motif
227 motif
228 motif
229 motif
229a motif
230 motif
240 motif
22a first motif
22b second motif
22c first quantity of motifs
22d second quantity of motifs
22e third quantity of motifs
22f fourth quantity of motifs
22g fifth quantity of motifs
22h sixth quantity of motifs
22i seventh quantity of motifs
22j eighth quantity of motifs
22k red motif
22l green motif
22m blue motif
30 virtual light source
300 virtual light source
301 virtual light source
31 virtual point light source
32 microsymbols
33 virtual reference light source
40 virtual electromagnetic field
41 virtual total electromagnetic field
42 reference direction
43 reference field
44 propagation direction
45 exposure direction
50 phase image
60 height profile
61 grayscale image
62 assigned height profile
63 optically variable structure
65 security strip
70 observer
71 sensor
72 light source
$\alpha$ angle
$\alpha_1$ angle
$\alpha_2$ angle
$\alpha_3$ angle
$\alpha_1'$ angle
$\alpha_2'$ angle
$\alpha_3'$ angle
$h_1$ distance
$h_2$ distance
$h_3$ distance
$h_4$ distance
$\Omega$ solid angle
$\Omega_1$ solid angle
$\Omega_2$ solid angle
N surface normal
$\beta_1$ angle
$\beta_2$ angle
K curve

The invention claimed is:

1. A method for producing a hologram for security elements and/or security documents, wherein
one or more virtual hologram planes are arranged in front of and/or behind one or more virtual models,
one or more virtual light sources are arranged on one or more partial regions of the surface of one or more of the virtual models,
one or more virtual electromagnetic fields are calculated starting from at least one of the virtual light sources in one or more zones of the one or more virtual hologram planes,
in the one or more zones, in each case, a virtual total electromagnetic field is calculated on the basis of the sum of two or more, of the virtual electromagnetic fields in the respective zone,
one or more phase images are calculated from the virtual total electromagnetic fields in the one or more zones,
a height profile of the hologram is calculated from the one or more phase images and the height profile of the hologram is incorporated into a substrate to provide the hologram,
wherein the virtual total electromagnetic fields in the one or more first zones are calculated in each case on the basis of the virtual electromagnetic fields of the one or more first virtual models and/or wherein the virtual total electromagnetic fields in the one or more second zones are calculated in each case on the basis of the virtual electromagnetic fields of the one or more second virtual models such that one or more first motifs assigned to the one or more first virtual models and/or that one or more second motifs assigned to the one or more second virtual models, are not detectable for an observer and/or for a sensor when illuminated with non-collimated light and/or are detectable for an observer and/or a sensor when illuminated with collimated light.

2. The method according to claim 1, wherein one or more of the virtual models are in each case formed as a virtual 2D model or as a virtual 3D model.

3. The method according to claim 1, wherein the virtual electromagnetic field, which starts from two or more of the virtual light sources has the same intensity and/or the same intensity distribution over one or more ranges of solid angles.

4. The method according to claim 1, wherein the virtual electromagnetic field, which starts from two or more of the virtual light sources, has different intensities and/or different intensity distributions over one or more ranges of solid angles.

5. The method according to claim 1, wherein the virtual electromagnetic field, which starts from one or more of the virtual light sources, has an isotropic or an anisotropic intensity distribution over one or more ranges of solid angles.

6. The method according to claim 1, wherein one or more of the virtual light sources form a virtual point light source.

7. The method according to claim 1, wherein the beam cone of the virtual light source, is restricted to a range of solid angles of ±45°, by means of a virtual aperture.

8. The method according to claim 1, wherein the virtual light sources which are arranged on one or more of the partial regions of the surface of one of the virtual models, are arranged periodically on the surface of the virtual model in at least one direction and/or are arranged randomly or pseudo-randomly on the surface of the virtual model in at least one direction.

9. The method according to claim 1, wherein the virtual model or each of the two or more virtual models is assigned to two or more of the virtual hologram planes and the one or more virtual electromagnetic fields starting from the one or more virtual light sources of the assigned virtual model or of the assigned virtual models are calculated in the one or more zones of the respective virtual hologram plane.

10. The method according to claim 1, wherein, to calculate the one or more phase images, the virtual total electromagnetic fields are superimposed by two or more of the zones which are zones of different ones of the virtual hologram planes.

11. The method according to claim 1, wherein the two or more zones superimposed to calculate the one or more phase images overlap at least partially in relation to the predefined reference direction with the result that two or more motifs provided by different zones in the provided hologram are generated in intersecting regions of surface of the provided hologram in relation to the predefined reference direction.

12. The method according to claim 1, wherein the two or more zones superimposed to calculate the one or more phase images do not overlap in relation to the predefined reference direction.

13. The method according to claim 1, wherein one or more of the virtual hologram planes in one or more of the zones have a curvature different from zero at least along a reference direction.

14. The method according to claim 1, wherein one or more of the virtual hologram planes in one or more of the zones have a predetermined curvature progression, and wherein the virtual total electromagnetic field in the one or more zones is calculated in each case on the basis of the virtual electromagnetic fields of one or more first ones of the one or more virtual models, with the result that the provided hologram is partially or completely detectable for an observer and/or for a sensor when the substrate is bent or curved according to the curvature progression of the one or more zones.

15. The method according to claim 1, wherein the one or more first motifs is detectable for an observer and/or for a sensor completely above and/or underneath and/or within the plane spanned by the substrate when the substrate is bent or curved according to the curvature progression of the one or more zones, wherein the distance between one or more of the first motifs and the plane spanned by the substrate is between −30 mm and +30 mm.

16. The method according to claim 1, wherein the virtual total electromagnetic fields in the one or more first zones is calculated in each case on the basis of the virtual electromagnetic fields of the one or more first virtual models and the virtual total electromagnetic fields in the one or more second zones is calculated in each case on the basis of the virtual electromagnetic fields of the one or more second virtual models, with the result that one or more first motifs assigned to the one or more first virtual models become partially or completely detectable for an observer and/or a sensor when the substrate is bent or curved according to the curvature progression of the one or more first zones, and wherein one or more second motifs assigned to the one or more second virtual models become partially or completely detectable for an observer and/or a sensor when the substrate is bent or curved according to the curvature progression of the one or more second zones.

17. The method according to claim 1, wherein the virtual total electromagnetic fields in the one or more first zones are calculated in each case on the basis of the virtual electromagnetic fields of the one or more first virtual models and/or in that the virtual total electromagnetic fields in the one or more second zones are calculated in each case on the basis of the virtual electromagnetic fields of the one or more second virtual models such that a first portion of the one or more first motifs assigned to the one or more first virtual models and/or that a second portion of the one or more second motifs assigned to the one or more second virtual models is detectable for an observer and/or for a sensor when the substrate is bent or curved.

18. The method according to claim 1, wherein the virtual total electromagnetic fields in the one or more first zones are calculated in each case on the basis of the virtual electromagnetic fields of the one or more first virtual models and the virtual total electromagnetic fields in the one or more second zones are calculated in each case on the basis of the virtual electromagnetic fields of the one or more second virtual models, with the result that one or more first motifs assigned to the one or more first virtual models become partially or completely detectable for an observer and/or a sensor when the substrate is aligned according to the alignment of the one or more first zones, and that the one or more second motifs assigned to the one or more second virtual models become partially or completely detectable for an observer and/or a sensor when the substrate is aligned according to the alignment of the one or more second zones.

19. The method according to claim 1, wherein two or more of the zones are assigned in each case to one of the virtual hologram planes and the virtual total electromagnetic fields in the one or more zones are calculated in each case on the basis of the virtual electromagnetic fields of the one or more zones, with the result that when the substrate is tilted and/or rotated one or more of the virtual models are partially or completely detectable by an observer and/or by a sensor as a sequence of one or more motifs assigned to the one or more virtual models.

20. The method according to claim 1, wherein, in one or more zones, in each case, a virtual total electromagnetic field is calculated on the basis of the sum of two or more, of the virtual electromagnetic fields in the respective zone multiplied by one or more virtual reference fields of one or more virtual reference light sources in the one or more zones.

21. The method according to claim 1, wherein the propagation direction of one or more of the virtual reference fields has an angle of between 10° and 50°, relative to the surface normal or relative to the average surface normal of one or more of the virtual hologram planes and/or the beam cone of one or more of the virtual reference light sources has an opening angle of between 0° and 45°, and/or one or more of the virtual reference light sources have a spacing from one or more of the virtual hologram planes of between 0.01 m and 10 m.

22. The method according to claim 1, wherein, during the calculation of the height profile of the provided hologram one or more of the phase images are transformed, into one or more assigned height profiles, wherein the height profile of the provided hologram is calculated by means of superimposition and/or gridding of the height profiles assigned to the one or more phase images.

23. The method according to claim 1, wherein one or more of the assigned height profiles are incorporated into a substrate to provide the hologram.

24. The method according to claim 1, wherein the assigned height profiles and/or the height profile of the provided hologram are or is encoded as a grayscale image, in which the grayscale values are assigned to height values.

25. The method according to claim 1, wherein the difference between the minimum height value of the height profile incorporated into the substrate and the maximum height value of the height profile incorporated into the substrate corresponds to an optical path difference of half or a multiple of half of a reference wavelength, in the case of the formation of the provided hologram as a reflection hologram, or wherein the difference between the minimum height value of the height profile incorporated into the substrate and the maximum height value of the height profile incorporated into the substrate corresponds to an optical path difference of a reference wavelength or a multiple of a reference wavelength, in the case of the formation of the provided hologram as a transmission hologram.

26. The method according to claim 1, wherein the assigned height profiles and/or the height profile of the provided hologram are or is incorporated into the substrate by means of a method selected from: laser beam lithography, electron beam lithography.

27. The method according to claim 1, wherein the assigned height profiles and/or the height profile of the provided hologram are or is incorporated into the substrate by means of a replication method.

28. The method according to claim 1, wherein the assigned height profiles and/or the height profile of the provided hologram are or is incorporated into a film by means of the methods electroplating, recombination and roll-to-roll replication.

29. The method according to claim 1, wherein the assigned height profiles and/or the height profile of the provided hologram are or is incorporated into a thin-film structure.

30. The method according to claim 1, wherein the assigned height profiles and/or the height profile of the hologram are or is incorporated into the substrate by exposure of a volume hologram material, wherein the assigned height profiles and/or the height profile of the hologram are or is determined here by the progression of the Bragg planes of the volume hologram generated hereby.

31. The method according to claim 1, wherein the height profile of at least one further optically variable structure, selected from: a diffractive relief structure, a zero-order diffraction structure, a blazed grating, a micromirror structure, an isotropic or anisotropic matte structure, a microlens structure, is incorporated into the substrate in addition to the assigned height profiles and/or the height profile of the hologram.

32. The method according to claim 1, wherein the assigned height profiles and/or the height profile of the hologram are or is incorporated into one or more first regions of the substrate and wherein the height profile of the at least one further optically variable structure is incorporated into one or more second regions of the substrate.

33. The method according to claim 1, wherein at least one or more of the second regions at least partially overlap one or more of the first regions.

34. The method according to claim 1, wherein the one or more first regions do not overlap the one or more second regions.

* * * * *